United States Patent
Wakabayashi

(10) Patent No.: US 9,664,934 B2
(45) Date of Patent: May 30, 2017

(54) FABRICATING METHOD OF ELECTRO-OPTICAL DEVICE, ELECTRO-OPTICAL DEVICE, AND ELECTRONIC APPARATUS

(71) Applicant: Seiko Epson Corporation, Tokyo (JP)

(72) Inventor: Junichi Wakabayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 14/694,099

(22) Filed: Apr. 23, 2015

(65) Prior Publication Data

US 2015/0331280 A1 Nov. 19, 2015

(30) Foreign Application Priority Data

May 14, 2014 (JP) ................. 2014-100228

(51) Int. Cl.
*G02F 1/1335* (2006.01)
*G02F 1/1333* (2006.01)
*G02F 1/1339* (2006.01)

(52) U.S. Cl.
CPC .......... *G02F 1/1333* (2013.01); *G02F 1/1339* (2013.01); *G02F 1/133512* (2013.01); *G02F 1/133526* (2013.01)

(58) Field of Classification Search
CPC ............. G02F 1/1333; G02F 1/133512; G02F 1/133526
USPC .......................................................... 349/57
See application file for complete search history.

(56) References Cited

U.S. PATENT DOCUMENTS

| | | | |
|---|---|---|---|
| 2002/0018278 A1* | 2/2002 | Sato | G02F 1/136209 359/245 |
| 2004/0100700 A1* | 5/2004 | Kitamura | B29D 11/00278 359/622 |
| 2006/0046486 A1 | 3/2006 | Ozawa | |
| 2006/0195293 A1 | 8/2006 | Koike et al. | |
| 2009/0257000 A1 | 10/2009 | Ogasawara et al. | |

FOREIGN PATENT DOCUMENTS

| | | |
|---|---|---|
| JP | 04-251221 A | 9/1992 |
| JP | 2004-325546 A | 11/2004 |
| JP | 2006-071941 A | 3/2006 |
| JP | 2006-235415 A | 9/2006 |
| JP | 4285373 B | 6/2009 |
| JP | 2009-258298 A | 11/2009 |
| JP | 2010-002450 A | 1/2010 |
| JP | 4518179 B | 8/2010 |

* cited by examiner

*Primary Examiner* — Lucy Chien
(74) *Attorney, Agent, or Firm* — ALG Intellectual Property, LLC

(57) ABSTRACT

A fabricating method of a liquid crystal device includes a first step of forming light blocking portions in an element substrate, a second step of forming first and second microlenses in a counter substrate, and a third step of disposing the element substrate and the counter substrate so as to face each other, such that the openings and the first and second microlenses overlap each other in a planar view, and bonding the element substrate to the counter substrate such that a liquid crystal layer is interposed therebetween. In the third step, a center of the first microlens and a center of the second microlens are disposed in the same side in at least one direction of the X direction and the Y direction with respect to a center of gravity of the opening, in a planar view.

16 Claims, 17 Drawing Sheets

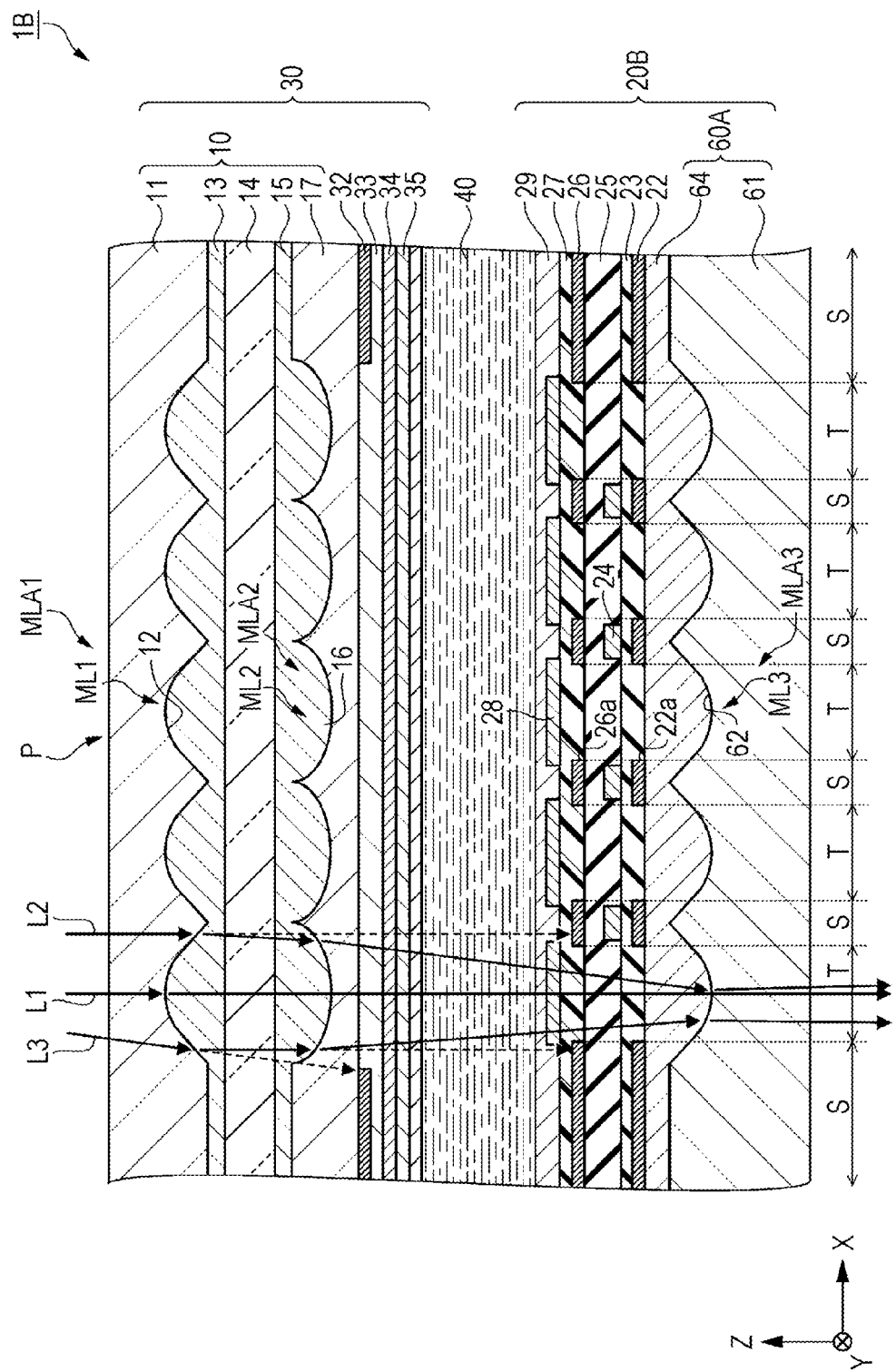

FABRICATING METHOD OF ELECTRO-OPTICAL DEVICE, ELECTRO-OPTICAL DEVICE, AND ELECTRONIC APPARATUS

BACKGROUND

1. Technical Field

The present invention relates to a fabricating method of an electro-optical device, an electro-optical device, and an electronic apparatus.

2. Related Art

An electro-optical device including an electro-optical material such as a liquid crystal that is positioned between an element substrate and a counter substrate is known. As the electro-optical device, for example, a liquid crystal device that is used as a liquid crystal light valve of a projector can be used. In the liquid crystal device, a light blocking portion is provided in an area in which switching elements, wires, or the like is disposed, and a portion of incident light is blocked by the light blocking portion and is not used. Therefore, a configuration is known, in which microlenses are included in at least one substrate, and light, which is blocked by the light blocking portion disposed in an boundary between pixels, from light that is incident on the liquid crystal device, is focused and made to be incident on an opening of pixels, and thereby utilization efficiency of light in the liquid crystal device is increased.

However, after being focused by the microlens and converged, the light is emitted in a radially spreading manner. There is a problem that if a light spreading angle becomes large so as to exceed an uptake angle of a projection lens and thereby vignetting occurs, utilization efficiency of light is decreased as a result. Regarding the disadvantage, a configuration of a liquid crystal device including microlenses of two stages has been proposed (for example, JP-A-2004-325546).

In the liquid crystal device described in JP-A-2004-325546, light that is incident is focused by a microlens of one stage provided in a counter substrate, and passes through an opening of a pixel, is returned to substantially parallel light by a microlenses of two stages provided in an element substrate, and thereby vignetting of a projection lens is suppressed. In addition, by taking into account a case in which a group shift occurs at the time of bonding the element substrate to the counter substrate, an area in which a light blocking portion (second light blocking film) provided in the counter substrate is formed is set to be smaller than an area in which a light blocking portion (first light blocking film) provided in the element substrate is formed.

However, in the liquid crystal device including the microlenses of two stages described in JP-A-2004-325546, there is a case in which, for example, due to variation or the like in the fabrication at the time of forming the microlens or the light blocking portion, in addition to the group shift at the time of bonding the element substrate to the counter substrate, the microlens of a first stage and the microlens of a second stage are shifted in directions different from each other with respect to the opening of the pixel. In other words, there is a case where, with respect to an boundary (or center of gravity of opening) between pixels adjacent to each other, the microlenses of the first stage on one pixel side is shifted toward another pixel side, and the microlens of the second stage on other pixel side is shifted to one pixel side. For example, if there is a shift in the liquid crystal device in which the microlenses of two stages is included in the counter substrate, the light that is incident on an end portion of the microlens of the first stage in the vicinity of the boundary between the pixels and is refracted, is refracted toward an opposite side at an end portion of the microlens of the second stage, and is blocked by the light blocking portion disposed in the boundary between the pixels. Then, there is a possibility that utilization efficiency of light in the liquid crystal device may decrease, a lifespan may be shortened due to an increase of internal temperature of the liquid crystal device according to the light irradiating the light blocking portion, or display quality may decrease due to the light reflected by the light blocking portion becoming stray light. In addition, in the projector including the liquid crystal device, for example, the light that is refracted toward a center of gravity of the opening of the pixel by the microlens of the first stage is refracted further in a direction that light intersects the center of gravity of the opening of the pixel by the microlens of the second stage and light is diffused, and thus vignetting occurs in the projection lens. Then, there is a possibility that utilization efficiency of light in the projector may decrease, and a decrease of display quality may occur, such as display distortion caused by a thermal expansion of the projection lens unit due to a temperature increase according to the light that is applied to the projection lens.

However, in JP-A-2004-325546, a case in which a shift occurs in a relative position of the microlens of the first stage, the microlens of the second stage, and the opening of the pixel, or an influence on the light that is obliquely incident in this case, is not described.

SUMMARY

An advantage of some aspects of the invention is to provide a fabricating method of an electro-optical device, an electro-optical device, and an electronic apparatus which can increase utilization efficiency of light and can suppress reduction of lifespan or display quality.

The invention can be realized as the following aspects or application examples.

Application Example 1

According to this application example, there is provided a fabricating method of an electro-optical device, the method including: a first step of forming light blocking portions that partition openings of each of a plurality of pixels, in a first substrate; a second step of forming a plurality of first microlenses and a plurality of second microlenses that correspond to the plurality of pixels, in a second substrate, such that each of the plurality of the first microlenses and each of the plurality of the second microlenses overlap each other in a planar view; and a third step of disposing the first substrate and the second substrate so as to face each other, such that the openings of each of the plurality of pixels, and each of the plurality of the first microlenses and each of the plurality of the second microlenses overlap each other in a planar view, and bonding the first substrate to the second substrate such that an electro-optical layer is interposed therebetween, in which the light blocking portion that is formed in the first step includes a portion extending in a first direction, and a portion extending in a second direction that intersects the first direction, and in which in the third step, the first substrate and the second substrate are disposed, such that a center of the first microlens and a center of the second microlens are positioned on the same side in at least one direction of the first direction and the second direction with respect to a center of gravity of the opening, in a planar view.

According to the fabricating method of this application example, an electro-optical device is fabricated in which an electro-optical layer is interposed between the first substrate in which light blocking portions that partition openings of each of a plurality of pixels is provided, and the second substrate in which a plurality of first microlenses and a plurality of second microlenses that correspond to the plurality of pixels, are provided such that each of the plurality of the first microlenses and each of the plurality of the second microlenses overlap each other in a planar view. There is a case in which the first microlens and the second microlens are shifted in a direction different from each other, with respect to the opening, due to variations or the like in the fabrication, in the electro-optical device. Then, for example, the light that is incident on an end portion of the first microlens in the vicinity of an boundary between the pixels from the second substrate side, and is refracted toward a center of the first microlens, can be refracted toward an opposite side at an end portion of the second microlens to be returned, and can be blocked by the light blocking portion disposed in the boundary between the pixels in the first substrate (refer to FIG. 7, for details).

Here, according to the fabricating method of this application example, the first substrate is bonded to the second substrate by shifting a relative position, such that the center of the first microlens and the center of the second microlens are positioned on the same side in at least one direction of the first direction and the second direction, with respect to the center of gravity of the opening (refer to FIG. 8 for details). In other words, the first microlens and the second microlens are disposed so as to be shifted toward the same side with respect to the light blocking portion disposed in the boundary between pixels adjacent to each other. For this reason, the light that is incident on an end portion of the first microlens in the vicinity of the boundary between the pixels and is refracted toward an opposite side at an end portion of the second microlens, can be led to the inside of the opening of the pixel. Accordingly, it is possible to suppress a decrease of utilization efficiency of light in the electro-optical device, to suppress reduction of lifespan due to an increase of internal temperature of a liquid crystal device according to the light applied to the light blocking portion, and to suppress a decrease of display quality due to the light reflected by the light blocking portion becoming stray light.

Application Example 2

According to this application example, there is provided a fabricating method of an electro-optical device, the method including: a first step of forming light blocking portions that partition openings of each of a plurality of pixels, and a plurality of second microlenses corresponding to the plurality of pixels in a first substrate, such that each opening of the plurality of pixels and each of the plurality of second microlenses overlap each other in a planar view; a second step of forming a plurality of first microlenses corresponding to the plurality of pixels, in a second substrate; and a third step of disposing the first substrate and the second substrate so as to face each other, such that the openings of each of the plurality of pixels and each of the plurality of the second microlenses, and each of the plurality of the first microlenses overlap each other in a planar view, and bonding the first substrate to the second substrate such that an electro-optical layer is interposed therebetween, in which the light blocking portion that is formed in the first step includes a portion extending in a first direction, and a portion extending in a second direction that intersects the first direction, and in which in the third step, the first substrate and the second substrate are disposed, such that a center of the first microlens and a center of the second microlens are positioned on the same side in at least one direction of the first direction and the second direction with respect to a center of gravity of the opening, in a planar view.

According to the fabricating method of this application example, an electro-optical device is fabricated which includes an electro-optical layer that is interposed between a first substrate in which each opening of the plurality of pixels and each of the plurality of the second microlenses are provided so as to overlap each other in a planar view, and the second substrate in which each of the plurality of the first microlenses is provided so as to overlap each opening of the plurality of pixels and each of the plurality of the second microlenses in a planar view. There is a case in which, in the electro-optical device, the center of the first microlens and the center of the second microlens are shifted in directions different from each other with respect to the opening, due to variations or the like in the fabrication. Then, for example, the light that is refracted toward the center (center of gravity of opening) of the first microlens is incident on the second microlens at a position not further than the center of the second microlens, is further refracted toward the center, and thus an angle with respect to the normal direction to the first substrate is large, and thereby the light is diffused so as to become light which is not used (refer to FIG. 12 for details).

Here, according to the fabricating method of this application example, the first substrate is bonded to the second substrate by shifting a relative position, such that the center of the first microlens and the center of the second microlens are positioned on the same side in at least one direction of the first direction and the second direction, with respect to the center of gravity of the opening (refer to FIG. 13 for details). For this reason, it is possible to make the light refracted toward the center (center of gravity of opening) of the first microlens in the first microlens be incident on the second microlens at a position further than the center of the second microlens, to make the light be refracted toward the center, to make the light be returned such that an angle with respect to the normal direction of the first substrate is small, and it is possible to emit the light. Accordingly, for example, when the electro-optical device is used for an electronic apparatus such as a projection type display device, it is possible to suppress a decrease of utilization efficiency of light in the electronic apparatus, and to suppress a decrease of display quality such as display distortion due to an increase of internal temperature of the electronic apparatus.

Application Example 3

In the fabricating method of an electro-optical device according to the application example, it is preferable that in the third step, the first substrate be bonded to the second substrate, such that the center of the first microlens and the center of the second microlens are positioned on the same side in the first direction and the second direction with respect to the center of gravity of the opening.

According to the fabricating method of this application example, the first substrate is bonded to the second substrate by shifting a relative position, such that the center of the first microlens and the center of the second microlens are positioned on the same side in both directions of the first direction and the second direction, with respect to the center of gravity of the opening. For this reason, in a configuration in which the light blocking portion is provided in the first substrate, and the first microlens and the second microlens are provided in the second substrate, the light that is incident on an end portion of the first microlens in the vicinity of an boundary between pixels adjacent to each other in both directions of the first direction and the second direction, and is refracted toward an opposite side at an end portion of the second microlens can be led to the inside of the opening of the pixel. In addition, in a configuration in which the light blocking portion and the first microlens are provided in the first substrate, and the second microlens is provided in the second substrate, the light that is refracted toward the center of the second microlens in both directions of the first direction and the second direction, can be returned and emitted, such that an angle with respect to the normal direction of the first substrate in the first microlens is decreased.

Application Example 4

In the fabricating method of an electro-optical device according to the application example, it is preferable that in the third step, for the first microlens and the second microlens, the first substrate and the second substrate be disposed, such that a distance between a center of a microlens farther from the light blocking portion in a thickness direction of the first substrate and the second substrate, and the center of gravity of the opening, in a planar view, is smaller than a distance between a center of a microlens closer to the light blocking portion and the center of gravity of the opening, in a planar view.

According to the fabricating method of this application example, the first substrate is bonded to the second substrate, such that a distance between the center of the microlens farther from the light blocking portion in a thickness direction and the center of gravity of the opening, in a planar view, is smaller than a distance between the center of the microlens closer to the light blocking portion and the center of gravity of the opening, in a planar view. When the light is refracted by the same angle, since a distance is increased between the light that is refracted by the microlens farther from the light blocking portion in a thickness direction and that reaches a surface in which the light blocking portion is formed, and the center of gravity of the opening, in a planar view, there is a risk that the light is blocked by the light blocking portion. Thus, by making the center of the microlens farther from the light blocking portion closer to the center of gravity of the opening, it is possible to reduce a risk that the light reaching a surface in which the light blocking portion is formed is blocked by the blocking portion.

Application Example 5

In the fabricating method of an electro-optical device according to the application example, it is preferable that in the first step, forming of a plurality of switching elements corresponding to the plurality of pixels, in an area that overlaps the light blocking portion of the first substrate in a planar view, be included.

According to the fabricating method of this application example, since the switching element is disposed in the area that overlaps the light blocking portion in a planar view, even if an area of the light blocking portion is small and thereby an opening ratio is increased, the light blocking portion can block the switching element.

Application Example 6

In the fabricating method of an electro-optical device according to the application example, it is preferable that the plurality of first microlenses and the plurality of second microlenses be formed so as to be continuously connected in the first direction and the second direction, respectively.

According to the fabricating method of this application example, the first microlenses and the second microlenses adjacent to each other in the first direction and the second direction are provided so as to be connected to each other. If the first microlenses and the second microlenses adjacent to each other are separated, the light that is incident on a portion between the first microlenses and a portion between the second microlenses is not led to the inside of the opening, and thus utilization efficiency of light is decreased. Then, when the center of the first microlens and the center of the second microlens are shifted with respect to the opening, a decrease of an amount of light that passes through the opening, or deviation of the distribution of brightness in the inside of the opening easily occurs. In contrast to this, through a configuration in which the first microlenses and the second microlenses adjacent to each are connected to each other, more incident light is led to the inside of the opening, and thus utilization efficiency of light can be increased. In addition, when the center of the first microlens and the center of the second microlens are shifted with respect to the opening, a decrease of an amount of light that passes through the opening can be suppressed, or deviation of the distribution of brightness in the inside of the opening can be suppressed.

Application Example 7

In the fabricating method of an electro-optical device according to the application example, it is preferable that an outline shape of the opening be a shape that is line-symmetric in at least one direction of the first direction and the second direction.

According to the fabricating method of this application example, if the outline shape of the opening is a shape that is line-symmetric in at least one direction of the first direction and the second direction, it is possible to decrease deviation of the distribution of brightness in the opening or to decrease variation of an amount of light that passes through the opening, when the center of the first microlens and the center of the second microlens are shifted with respect to the opening, compared to when the outline shape of the opening is a shape that is non-line-symmetric in both directions of the first direction and the second direction.

Application Example 8

According to this application example, there is provided an electro-optical device, including: a first substrate in which light blocking portions that partition openings of each of a plurality of pixels are provided; a second substrate which is disposed so as to face the first substrate, and in which each of a plurality of first microlenses and each of a plurality of second microlenses are provided so as to overlap each opening of the plurality of pixels in a planar view; and an electro-optical layer that is disposed between the first substrate and the second substrate, in which the light blocking portion includes a portion extending in a first direction, and a portion extending in a second direction that intersects the first direction, and in which a center of the first microlens and a center of the second microlens are disposed on the same side in at least one direction of the first direction and the second direction with respect to a center of gravity of the opening, in a planar view.

According to the configuration of this application example, the first microlens and the second microlens are disposed so as to be shifted to the same side with respect to the light blocking portion disposed in an boundary between pixels adjacent to each other. For this reason, the light that is incident on an end portion of the first microlens in the vicinity of the boundary between the pixels and is refracted toward an opposite side at an end portion of the second microlens, can be led to the inside of the opening of the pixel. Accordingly, it is possible to suppress a decrease of utilization efficiency of light in the electro-optical device, to suppress reduction of lifespan due to an increase of internal temperature of the liquid crystal device according to the light applied to the light blocking portion, and to suppress a decrease of display quality due to the light refracted by the light blocking portion becoming stray light.

Application Example 9

According to this application example, there is provided an electro-optical device, including: a first substrate in which light blocking portions that partition openings of each of a plurality of pixels are provided, and a plurality of second microlenses are provided so as to overlap each opening of the plurality of pixels in a planar view; a second substrate which is disposed so as to face the first substrate, and in which each of a plurality of first microlenses is provided so as to overlap each opening of the plurality of pixels and each of the plurality of second microlenses in a planar view; and an electro-optical layer that is disposed between the first substrate and the second substrate, in which the light blocking portion includes a portion extending in a first direction, and a portion extending in a second direction that intersects the first direction, and in which a center of the first microlens and a center of the second microlens are disposed on the same side in at least one direction of the first direction and the second direction with respect to a center of gravity of the opening, in a planar view.

According to the configuration of this application example, the center of the first microlens and the center of the second microlens are disposed on the same side in at least one direction of the first direction and the second direction, with respect to the center of gravity of the opening. For this reason, the light that is refracted toward the center (center of gravity of opening) of the second microlens in the second microlens can be incident on the first microlens at a position further than the center of the first microlens, can be refracted toward the center, can be returned such that an angle with respect to the normal direction of the first substrate is decreased, and can be emitted. Accordingly, for example, when the electro-optical device is used for an electronic apparatus such as a projection type display device, it is possible to suppress a decrease of utilization efficiency of light in the electronic apparatus, and to suppress a decrease of display quality such as display distortion due to an increase of internal temperature of the electronic apparatus.

Application Example 10

In the electro-optical device according to the application example, it is preferable that the plurality of first microlenses and the plurality of second microlenses be formed so as to be continuously connected in the first direction and the second direction, respectively, and an outline shape of the opening is a shape that is line-symmetric in at least one direction of the first direction and the second direction.

According to the configuration of this application example, the first microlenses and the second microlenses adjacent to each other in the first direction and the second direction are provided so as to be connected to each other, and the outline shape of the opening is a shape that is line-symmetric in at least one direction of the first direction and the second direction. For this reason, it is possible to decrease deviation of the distribution of brightness in the opening or to decrease variation of an amount of light that passes through the opening, when the center of the first microlens and the center of the second microlens are shifted with respect to the opening, compared to when the first microlenses and the second microlenses adjacent to each other are separated from each other, and to when the outline shape of the opening is a shape that is non-line-symmetric in both directions of the first direction and the second direction.

Application Example 11

According to this application example, there is provided an electronic apparatus including; an electro-optical device that is manufactured using the fabricating method of the electro-optical device of the above-described application example; or the electro-optical device of the above-described application example.

According to the configuration of this application example, it is possible to provide an electronic apparatus with a bright display and an excellent display quality.

BRIEF DESCRIPTION OF THE DRAWINGS

The invention will be described with reference to the accompanying drawings, wherein like numbers reference like elements.

FIG. 15 is a schematic cross-sectional view illustrating a configuration of a liquid crystal device according to a first modification example.

DESCRIPTION OF EXEMPLARY EMBODIMENTS

Hereinafter, specific embodiments according to the invention will be described with reference to the drawings. Figures to be used are appropriately illustrated in an enlarged, reduced, or exaggerated manner, such that a portion to be described is in a recognizable state. In addition, there is a case in which configuration elements other than those necessary for description are not illustrated.

In the following forms, in a case in which, for example, "on a substrate" is described, this indicates a case in which a member is disposed on the substrate so as to be in contact with the substrate, a case in which the member is disposed over the substrate via other configuration material, or a case in which a portion of the member is disposed on the substrate such that the portion thereof is in contact with the substrate, and another portion is disposed via another configuration material.

First Embodiment

Electro-Optical Device

Herein, as an electro-optical device, an active matrix type liquid crystal device in which a thin film transistor (TFT) is included as a switching element of a pixel, is used as an example. The liquid crystal device can be appropriately used as, for example, a light modulation element (liquid crystal light valve) of a projection display device (projector) that will be described later.

Figure 1:
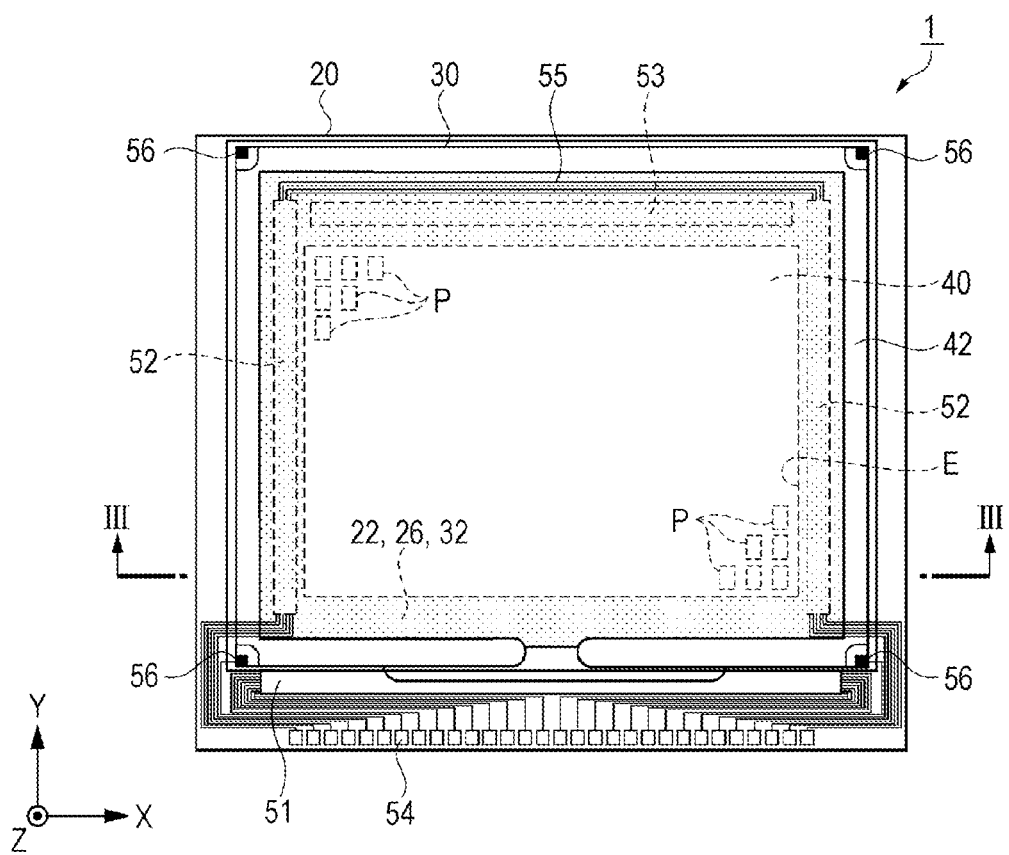
FIG. 1 is a schematic plan view illustrating a configuration of a liquid crystal device according to a first embodiment.
Figure 2:
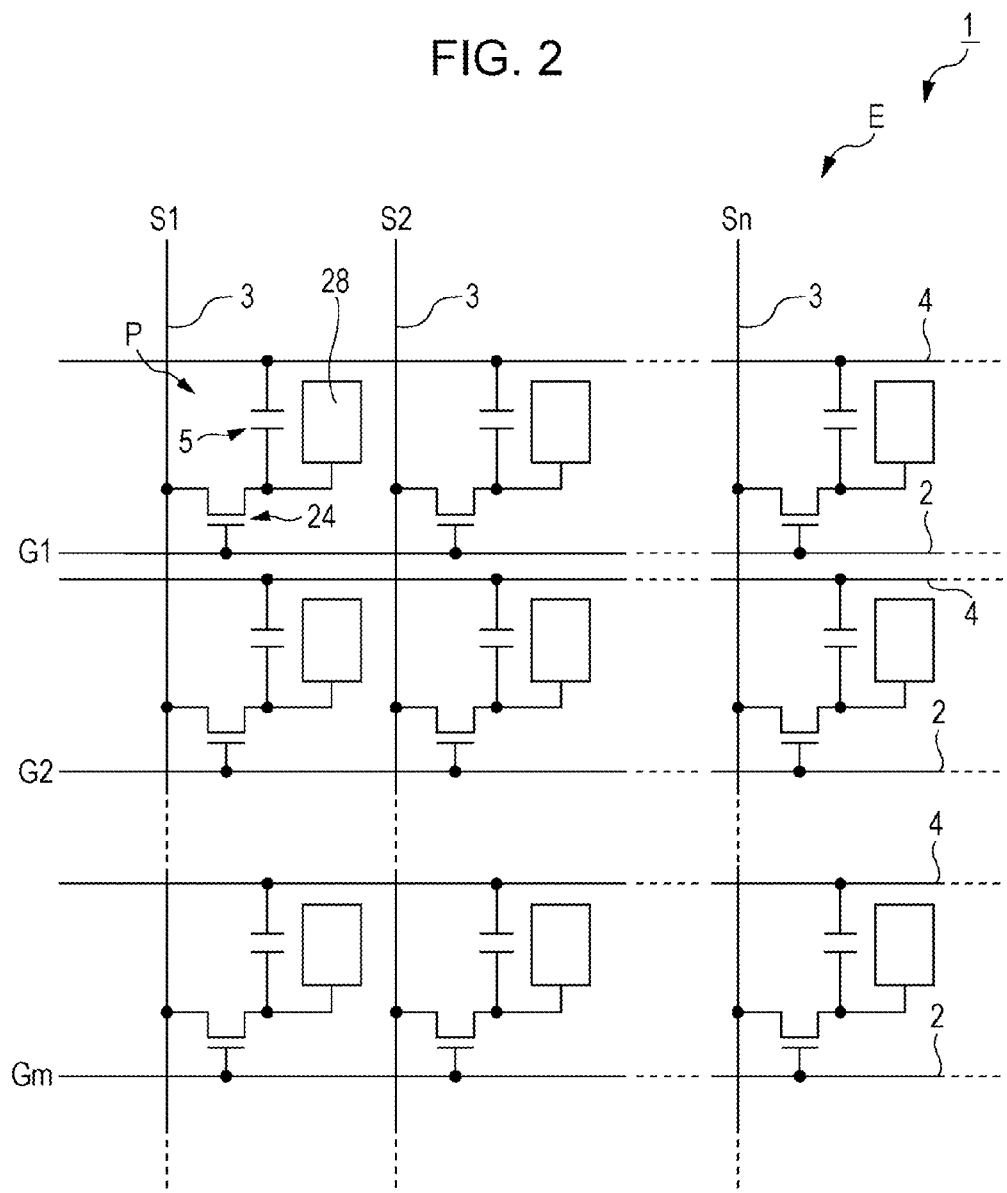
FIG. 2 is an equivalent circuit diagram illustrating an electrical configuration of the liquid crystal device according to the first embodiment.
Figure 3:
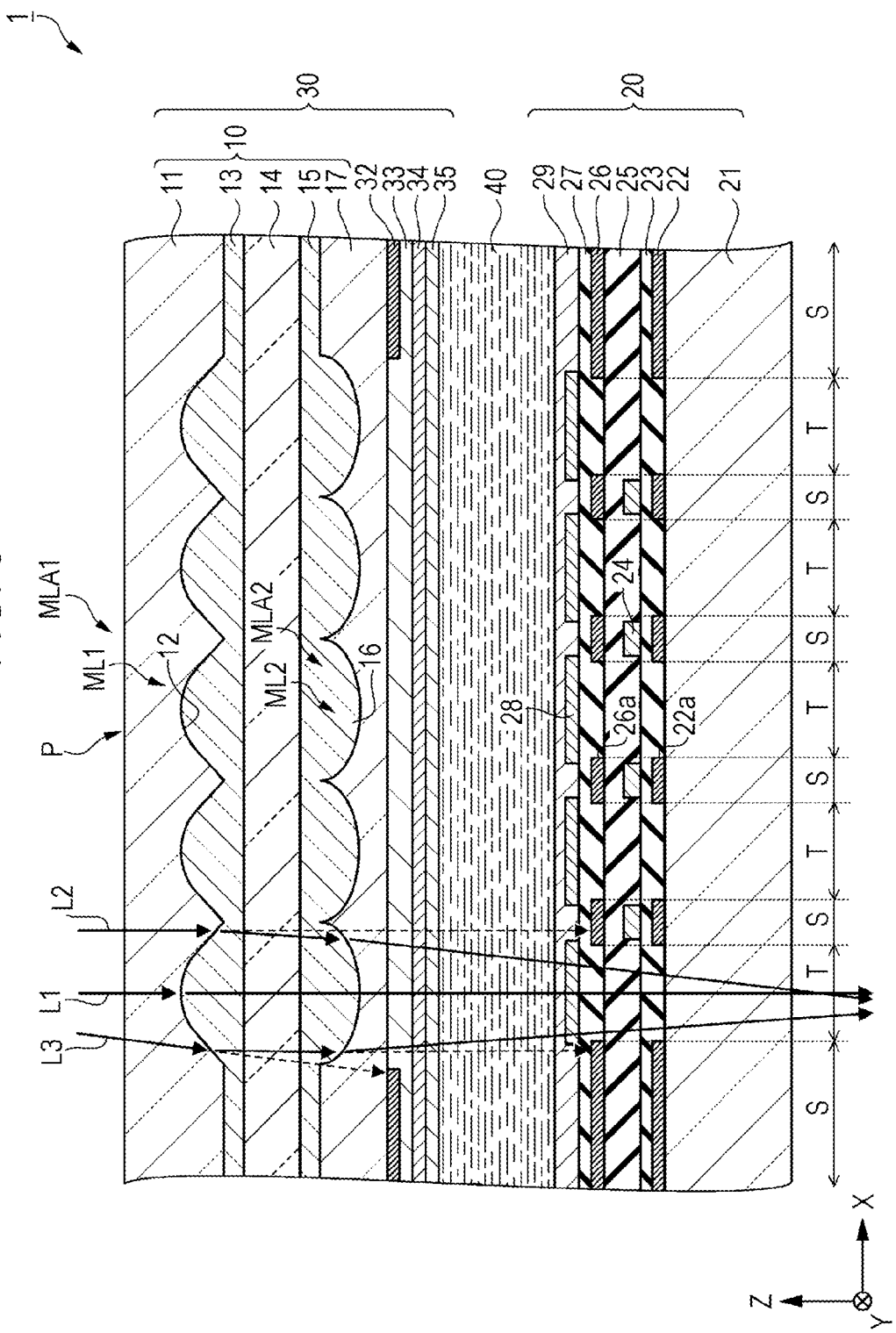
FIG. 3 is a schematic cross-sectional view illustrating a configuration of the liquid crystal device according to the first embodiment.
Figure 4:
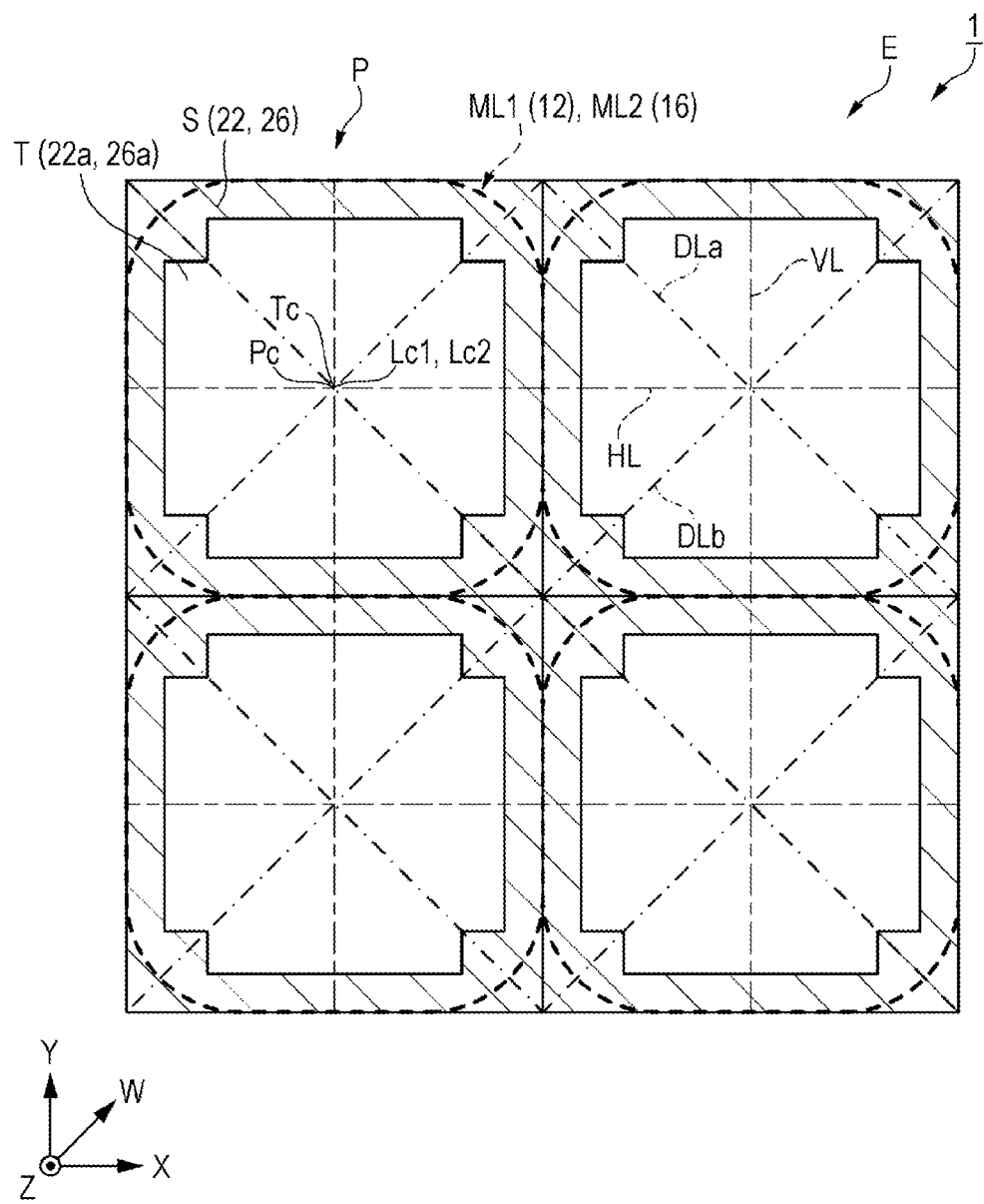
FIG. 4 is a schematic plan view illustrating a light blocking portion and opening of pixels of the liquid crystal device according to the first embodiment.
Figure 17:
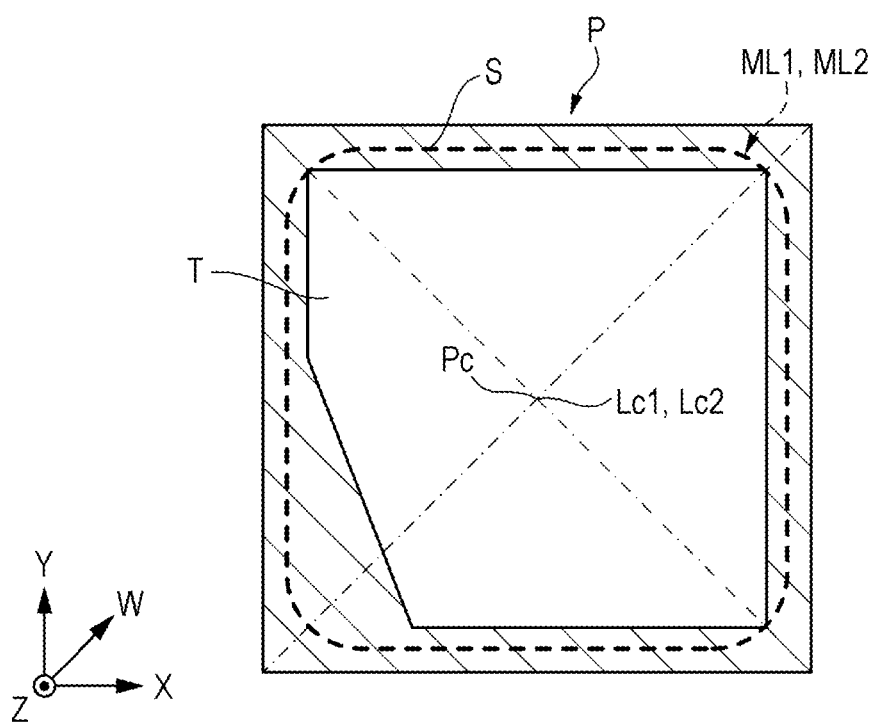
FIG. 17 is a schematic plan view illustrating a light blocking portion and an opening of a pixel of a liquid crystal device of the related art.

To begin with, a liquid crystal device which functions as an electro-optical device according to a first embodiment will be described with reference to FIG. 1, FIG. 2, FIG. 3 and FIG. 4. FIG. 1 is a schematic plan view illustrating a configuration of a liquid crystal device according to a first embodiment. FIG. 2 is an equivalent circuit diagram illustrating an electrical configuration of the liquid crystal device according to the first embodiment. FIG. 3 is a schematic cross-sectional view illustrating a configuration of the liquid crystal device according to the first embodiment. Specifically, FIG. 3 is a schematic cross-sectional view which is cut along a line III-III of FIG. 1. FIG. 4 is a schematic plan view illustrating a light blocking portion and opening of pixels of the liquid crystal device according to the first embodiment. In addition, FIG. 17 is a schematic plan view illustrating a light blocking portion and an opening of a pixel of a liquid crystal device of the related art.

As illustrated in FIG. 1 and FIG. 3, a liquid crystal device 1 according to the present embodiment includes an element substrate 20 which is referred to as a first substrate, a counter substrate 30 which is referred to as a second substrate that is disposed on a side opposite to the element substrate 20, a sealing material 42, and a liquid crystal layer 40 which is referred to as an electro-optical layer. As illustrated in FIG. 1, the element substrate 20 is larger than the counter substrate 30, and both substrates are bonded together via the sealing material 42 that is disposed in a frame shape along edges of the counter substrate 30.

The liquid crystal layer 40 is configured by a liquid crystal with a positive or negative dielectric anisotropy that is inserted in a space which is surrounded by the element substrate 20, the counter substrate 30, and the sealing material 42. The sealing material 42 is formed of an adhesive such as an epoxy resin with, for example, a thermosetting property or an ultraviolet curable property. In the sealing material 42, spacers (not illustrated) for retaining a constant interval between the element substrate 20 and the counter substrate 30 are mixed in.

Inside the sealing material 42 that is disposed in a frame shape, light blocking layers 22 and 26 that are provided in the element substrate 20, and a light blocking layer 32 that is provided in the counter substrate 30 are disposed. The light blocking layers 22, 26, and 32 have rim portions of a frame shape, and are formed of a metal with a light blocking property, a metal oxide, or the like. The insides of the light blocking layers 22, 26, and 32 of a frame shape are formed as a display area E in which a plurality of pixels P is disposed. The pixels P respectively have, for example, an approximately rectangular shape, and are disposed in a matrix.

The display area E is an area that contributes to an actual display in the liquid crystal device 1. The light blocking layers 22 and 26 that are provided in the element substrate 20 are provided in, for example, a lattice pattern in the display area E, such that opening areas of a plurality of pixels P are partitioned in a flat manner. The liquid crystal device 1 may include a dummy area that is provided so as to surround the periphery of the display area E and does not contribute to an actual display.

On a side opposite to the display area E of the sealing material 42 that is formed along a first side of the element substrate 20, a data line drive circuit 51 and a plurality of outside connection terminals 54 are provided along the first side. In addition, on the display area E side of the sealing material 42 along a second side opposite to the first side, a test circuit 53 is provided. Furthermore, the inside of the sealing material 42 along other two sides that are orthogonal to the two sides and face each other, a scan line drive circuit 52 is provided.

On the display area E side of the sealing material 42 of the second side in which the test circuit 53 is provided, a plurality of wires 55 that are connected to two scan line drive circuits 52 is provided. The wires that are connected to the data line drive circuit 51 and the scan line drive circuit 52 are connected to the plurality of outside connection terminals 54. In addition, on the corners of the counter substrate 30, upper and lower conduction portions 56 for electrically connecting between the element substrate 20 and the counter substrate 30 are provided. The disposition of the test circuit 53 is not limited to this, and may be provided at a position along an inner side of the sealing material 42 between the data line drive circuit 51 and the display area E.

In the following description, a direction along the first side in which the data line drive circuit 51 is provided is referred to as an X direction as a first direction, and a direction along the other two sides that are orthogonal to the first side and face each other is referred to as a Y direction as a second direction. The X direction is a direction along a line I-I of FIG. 1. The light blocking layers 22 and 26 are provided along the X direction and the Y direction in a lattice pattern. The opening areas of the pixels P are partitioned in a lattice pattern by the light blocking layers 22 and 26, and are arranged along the X direction and the Y direction in a matrix.

In addition, a direction that is orthogonal to the X direction and the Y direction, and is upward in FIG. 1 is referred to as Z direction. In the present specification, viewing from a normal direction (Z direction) to a surface on the counter substrate 30 side of the liquid crystal device 1 is referred to as a "planar view".

As illustrated in FIG. 2, scan lines 2 and data lines 3 are formed so as to intersect each other in the display area E, and the pixel P is provided in correspondence to an intersecting point of the scan line 2 and the data line 3. A pixel electrode 28 and a TFT 24 which functions as a switching element are provided in each pixel P.

A source electrode (not illustrated) of the TFT 24 is electrically connected to the data line 3 extending from the data line drive circuit 51. Image signals (data signals) S1, S2, ..., Sn are sequentially supplied from the data line drive circuit 51 (refer to FIG. 1) to the data line 3. A gate electrode (not illustrated) of the TFT 24 is a portion of the scan line 2 extending from the scan line drive circuit 52. Scan signals G1, G2, ..., Gm are sequentially supplied from the scan line drive circuit 52 to the scan line 2. A drain electrode (not illustrated) of the TFT 24 is electrically connected to the pixel electrode 28.

When the TFT 24 is in an ON state for a predetermined period of time only, the image signals S1, S2, ..., Sn are written to the pixel electrode 28 via the data line 3 at a predetermined timing. By doing this, the image signal with a predetermined level that is written to the liquid crystal layer 40 via the pixel electrode 28 is retained in a liquid crystal capacitor formed between common electrode 34 and the liquid crystal layer 40 (refer to FIG. 3) provided in the counter substrate 30, for a predetermined period of time.

In order to prevent the retained image signals S1, S2, ..., Sn from leaking, a storage capacitor 5 is formed between the capacitance line 4 formed along the scan line 2, and the pixel electrode 28, and disposed in parallel to liquid crystal capacitors. In this way, if a voltage signal is applied to a liquid crystal of each pixel P, an orientation state of the liquid crystal is changed by the applied voltage level. Accordingly, light incident to the liquid crystal layer 40 (refer to FIG. 3) is modulated and a gradation display can be performed.

When orientation or order of molecular aggregates is changed by the applied voltage level, the liquid crystal that configures the liquid crystal layer 40 modulates light, and performs the gradation display. For example, in a case of a normally white mode, transmissivity of incident light is decreased according to a voltage applied by a unit of each pixel P. In a case of a normally black mode, the transmissivity of incident light is increased according to the voltage applied by a unit of each pixel P, and as a whole, light with contrast according to the image signal is emitted from the liquid crystal device 1.

As illustrated in FIG. 3, the counter substrate 30 according to the first embodiment includes the microlens array substrate 10, the light blocking layer 32, a protection layer 33, the common electrode 34, and an orientation film 35. The microlens array substrate 10 according to the first embodiment includes microlenses of two stages that are configured by microlenses ML1 of a first stage and microlenses ML2 of a second stage.

The microlens array substrate 10 includes a substrate 11, a lens layer 13, an intermediate layer 14, a lens layer 15, and a planarizing layer 17. The substrate 11 is formed of an inorganic material with optical transmissivity, such as glass or quartz. The substrate 11 has a plurality of concave portions 12 formed on a surface of the liquid crystal layer 40 side. Each concave portion 12 is provided in correspondence to a pixel P. A cross-sectional shape of the concave portion 12 has a center portion that is formed of a curved surface portion, for example, and a rim portion that surrounds the curved surface portion is formed of an inclined surface (so-called tapered surface).

The lens layer 13 is thicker than a depth of the concave portion 12 so as to fill the concave portion 12 and cover the substrate 11. The lens layer 13 has optical transmissivity, and is formed of a material with an optical refractive index different from that of the substrate 11. In the present embodiment, the lens layer 13 is formed of an inorganic material with a higher optical refractive index than that of the substrate 11. For example, SiON, $Al_2O_3$, or the like can be used as the inorganic material.

The concave portion 12 is filled with a material that forms the lens layer 13, and thereby the microlens ML1 with a convex shape as the first microlens is configured. Thus, each microlens ML1 is provided in correspondence to the pixel P. In addition, a microlens array MLA1 is configured by a plurality of microlenses ML1. A surface of the lens layer 13 is formed of an approximately flat surface.

Incident light that is incident to the center portion (curved surface portion) of the microlens ML1 is focused into a center Lc1 (refer to FIG. 4) side of the microlens ML1. In addition, incident light that is incident to the rim portion (inclined surface) of the microlens ML1 is refracted toward the center Lc1 side of the microlens ML1. If an incident angle of incident light is approximately the same, the incident light is refracted in approximately the same angle in the rim portion, and compared to a case in which all the microlenses ML1 are formed of curved surface portions, excessive refraction of the incident light is suppressed, and variation of an angle of the light incident on the liquid crystal layer 40 is suppressed.

The intermediate layer 14 is formed so as to cover the lens layer 13. The intermediate layer 14 has optical transmissivity, and for example, is formed of an inorganic material with approximately the same optical refractive index as that of the substrate 11. For example, $SiO_2$ or the like is used as the inorganic material. The intermediate layer 14 has a function of adjusting a distance between the microlens ML1 and the microlens ML2 to a desired value. Thus, a thickness of the intermediate layer 14 is appropriately set based on an optical condition such as a focus distance of the microlens ML1 according to a wavelength of light. The intermediate layer 14 may be formed of the same material as that of the lens layer 13, and may be formed of the same material as that of the lens layer 15.

The lens layer 15 is formed so as to cover the intermediate layer 14. The lens layer 15 has a plurality of convex portions 16 that are formed on the liquid crystal layer 40 side. Each convex portion 16 is provided in correspondence to the pixel P. Thus, each convex portion 16 is disposed so as to overlap each concave portion 12 in a planar view. A cross-sectional shape of the convex portion 16 is formed of a curved surface such as an approximately elliptical sphere. The lens layer 15 has, for example, the same light refractive index as the lens layer 13, and is formed of the same material as that of the lens layer 13.

The planarizing layer 17 is formed to be thicker than a height of the convex portion 16, so as to fill between the convex portions 16 and the periphery of the convex portion 16 and cover the lens layer 15. The planarizing layer 17 has optical transmissivity, and is formed of an inorganic material with a lower optical transmissivity than that of the lens layer 15, for example. For example, $SiO_2$ or the like is used as the inorganic material. By covering the convex portion 16 with the planarizing layer 17, the microlens ML2 with a convex shape as the second microlens is configured. Each microlens ML2 is provided in correspondence to the pixel P. In addition, a microlens array MLA2 is configured by the plurality of microlens ML2.

The planarizing layer 17 has a function to adjust a distance between the microlens ML2 and the light blocking layer 26 to a desired value. Thus, a layer thickness of the planarizing layer 17 is appropriately set based on an optical condition such as a focus distance of the microlens ML2 according to a wavelength of light. A surface of the planarizing layer 17 is formed of an approximately flat surface.

The light blocking layer 32 is formed on the microlens array substrate 10 (planarizing layer 17). The light blocking layer 32 is provided so as to surround the periphery of the display area E (refer to FIG. 1) in which the microlenses ML1 and the microlenses ML2 are disposed. The light blocking layer 32 is formed of, for example, a metal, a metal compound, or the like. The light blocking layer 32 may be provided so as to overlap the light blocking layer 22 and the light blocking layer 26 of the element substrate 20 in a planar view, in the display area E. In this case, the light blocking layer 32 may be formed in a lattice pattern, an island shape, a stripe shape, or the like, but it is preferable that the light blocking layer 32 be disposed within a range narrower than the light blocking layer 22 and the light blocking layer 26 in a planar view.

The protection layer 33 is provided so as to cover the microlens array substrate 10 (planarizing layer 17) and the light blocking layer 32. The common electrode 34 is provided so as to cover the protection layer 33. The common electrode 34 is formed across the plurality of pixels P. The common electrode 34 is formed of a transparent conductive film, of such as an indium tin oxide (ITO), or anindium zinc oxide (IZO). The protection layer 33 covers the light blocking layer 32 so as to planarize a surface on the liquid crystal layer 40 of the common electrode 34, but the common electrode 34 may be formed so as to directly cover the light blocking layer 32 with conductivity without providing the protection layer 33. The orientation film 35 is provided so as to cover the common electrode 34.

The element substrate 20 includes the substrate 21, the light blocking layer 22, an insulating layer 23, the TFT 24, an insulating layer 25, the light blocking layer 26, an insulating layer 27, the pixel electrode 28, and an orientation film 29. The substrate 21 is formed of a material with optical transmissivity, such as glass or quartz.

The light blocking layer 22 is provided on the substrate 21. The light blocking layer 22 is formed in a lattice pattern so as to overlap the light blocking layer 26 of a layer above in a planar view. The light blocking layer 22 and light blocking layer 26 are formed of, for example, a metal, a metal compound, or the like. The light blocking layer 22 and the light blocking layer 26 are disposed so as to have the TFT 24 interposed therebetween in a thickness direction (Z direction) of the element substrate 20. The light blocking layer 22 overlaps at least a channel area of the TFT 24 in a planar view.

By providing the light blocking layer 22 and the light blocking layer 26, the incident light to the TFT 24 is decreased, and thus it is possible to suppress an increase of a light leakage current or malfunctioning caused by light in the TFT 24. A light blocking portion S is configured by the light blocking layer 22 and the light blocking layer 26. An area (within opening 22a) surrounded by the light blocking layer 22 and an area (within opening 26a) surrounded by the light blocking layer 26 overlap each other in a planar view, and become openings T, through which the light passes, in the areas of the pixels P.

The insulating layer 23 is provided so as to cover the substrate 21 and the light blocking layer 22. The insulating layer 23 is formed of an inorganic material such as $SiO_2$.

The TFT 24 is provided on the insulating layer 23, and is disposed in an area that overlaps the light blocking layer 22 and the light blocking layer 26 in a planar view. The TFT 24 is a switching element that drives the pixel electrode 28. The TFT 24 is configured with a semiconductor layer, a gate electrode, a source electrode, and a drain electrode that are not illustrated. A source area, a channel area, and a drain area are formed in the semiconductor layer. A lightly doped drain (LDD) area may be formed in an boundary between the channel area and the source area, or between the channel area and the drain area.

The gate electrode is formed in an area that overlaps the channel area of the semiconductor layer in the element substrate 20 in a planar view, via a portion (gate insulating film) of the insulating layer 25. While not illustrated, the gate electrode is electrically connected to the scan line disposed in a lower layer side via a contact hole, and by the scan signal that is applied, the TFT 24 is turned on or off.

The insulating layer 25 is provided so as to cover the insulating layer 23 and the TFT 24. The insulating layer 25 is formed of an inorganic material such as $SiO_2$. The insulating layer 25 includes a gate insulating film that insulates between the semiconductor layer of the TFT 24 and the gate electrode. A roughness of the surface that is formed by the TFT 24 is decreased by the insulating layer 25. The light blocking layer 26 is provided on the insulating layer 25. Then, the insulating layer 27 that is formed of an inorganic material is provided so as to cover the insulating layer 25 and the light blocking layer 26.

The pixel electrode 28 is provided in correspondence to the pixel P on the insulating layer 27. The pixel electrode 28 is disposed in an area that overlaps the opening 22a of the light blocking layer 22 and the opening 26a of the light blocking layer 26 in a planar view. The pixel electrode 28 is formed of a transparent conductive film, of such as an indium tin oxide (ITO), or an indium zinc oxide (IZO). The orientation film 29 is provided so as to cover the pixel electrode 28. The liquid crystal layer 40 is inserted between the orientation film 29 on the element substrate 20 side and the orientation film 35 on the counter substrate 30 side.

While not illustrated, an electrode, a wire, a relay electrode, a capacitance electrode configuring the storage capacitor 5 (refer to FIG. 2), or the like for supplying an electrical signal to the TFT 24 are provided in an area that overlaps the light blocking layer 22 and the light blocking layer 26 in a planar view. The light blocking layer 22 and the light blocking layer 26 may be configured to include the electrode, the wire, the relay electrode, the capacitance electrode, or the like.

In the liquid crystal device 1 according to the first embodiment, for example, the light that is emitted from a light source or the like is incident from the counter substrate 30 (substrate 11) side including the microlenses ML1 and ML2. In the incident light, the light L1 that is incident on the center Lc1 of the microlens ML1 along a normal direction of the surface of the counter substrate 30 (substrate 11) travels in a straightline, is incident on the center Lc2 (refer to FIG. 4) of the microlens ML2, travels in a straight line as it is, and passes through the opening T of the pixel P, and is emitted toward the element substrate 20 side.

Hereinafter, the normal direction of the surface of the counter substrate 30 (substrate 11) is simply referred to as a "normal direction". The "normal direction" is a direction along the Z direction of FIG. 3, and is approximately the same direction as the normal direction of the element substrate 20 (substrate 21).

If the light L2 that is incident on an end portion of the microlens ML1 along the normal direction travels in a straight line as it is, the light is blocked by the light blocking layer 26 as illustrated by a dashed line. However, the light is refracted toward the center Lc1 side of the microlens ML1 by an optical refractive index difference (positive refractive power) between the substrate 11 and the lens layer 13, and is incident on the microlens ML2. Then, the light L2 that is incident on the microlens ML2 is further refracted toward the center Lc2 side of the microlens ML2 by an optical refractive index difference (positive refractive power) between the lens layer 15 and the planarizing layer 17, passes through the opening T of the pixel P, and is emitted toward the element substrate 20 side.

If the light L3 that is incident on an end portion of the microlens ML1 in an inclined manner with respect to the normal direction, and is incident toward a position further outward than the center Lc1 of the microlens ML1, travels in a straight line as it is, the light is blocked by the light blocking layer 32 as illustrated by a dashed line. However, the light is refracted toward the center Lc1 side of the microlens ML1 by an optical refractive index difference between the substrate 11 and the lens layer 13, and is incident on the microlens ML2. If the light L3 that is incident on the microlens ML2 travels in a straight line as it is, the light is blocked by the light blocking layer 26 as illustrated by a dashed line, but the light is refracted toward the center Lc2 side of the microlens ML2 by an optical refractive index difference between the lens layer 15 and the planarizing layer 17, passes through the opening T of the pixel P, and is emitted toward the element substrate 20 side.

In this way, in the liquid crystal device 1, the lights L2 and L3 that are blocked by the light blocking layer 32 and the light blocking layer 26 when travelling in a straight line as they are, can be refracted toward the center Lc1 and Lc2 sides by actions of the two-stage microlenses ML1 and ML2, that is, a center of gravity Tc (refer to FIG. 4) side of the opening T of the pixel P, and can pass through the opening T. As a result, it is possible to increase an amount of light that is emitted from the element substrate 20 side, and thus it is possible to increase utilization efficiency of light.

When the intermediate layer 14 is configured by a material with a smaller optical refractive index than that of the lens layer 13 or the lens layer 15, the light is refracted also in an interface between the lens layer 13 and the intermediate layer 14, and an boundary between the intermediate layer 14 and the lens layer 15. However, the refraction of the light in the interfaces is slight compared to the refraction of the light by the microlenses ML1 and ML2, and thus, it will be ignored herein.

As illustrated in FIG. 4, in the display area E of the liquid crystal device 1, the plurality of pixels P are arranged in a matrix with a predetermined disposition pitch. FIG. 4 illustrates four pixels P adjacent to each other. Each of the pixel P has an approximately rectangular flat surface shape, and the pixels P adjacent to each other in the X direction and the Y direction are arranged so as to be in contact with each other.

Two diagonal lines that connect the opposite corners of the pixels P are respectively referred to as DLa and DLb. An intersection point of the diagonal line DLa and the diagonal line DLb is a center Pc of the pixel P. A direction along the diagonal line DLb is referred to as a W direction. The W direction is a direction intersecting the X direction and the Y direction in a flat surface that is configured with the X direction and the Y direction.

As illustrated by hatching in FIG. 4, the light blocking portions S are provided in a lattice pattern in the display area E of the liquid crystal device 1. The light blocking portion S is configured by the light blocking layer 22 and the light blocking layer 26. In other words, at least a portion of the light blocking layer 22 and the light blocking layer 26 is disposed in the light blocking portion S. In the areas of each pixel P, an area which overlaps the light blocking portion S in a planar view is a non-opening area that the light does not pass through, and an area which overlaps the opening T in a planar view is an opening area that the light passes through. The TFT 24 is disposed in an area that overlaps the light blocking portion S in a planar view.

The light blocking portion S has a portion extending in the X direction and a portion extending in the Y direction. In the present embodiment, the light blocking portion S has a portion that protrudes toward the opening T side in four corners. In the protruding portion of the light blocking portion S, for example, a portion of the TFT 24 is disposed, but alternatively a relay electrode, a capacitance electrode, or the like may be disposed. Since the light blocking portion S is formed in such a shape, even if an area of the light blocking portion S becomes small and thereby an opening ratio is increased, it is possible to reliably block the TFT 24.

The light blocking portion S has the opening T corresponding to each of the plurality of pixels P. The opening T has an outline shape in which four corners with an approximately rectangular shape are recessed. The opening T has an outline shape that is line-symmetric with respect to a straight line in the X direction and a straight line in the Y direction. The opening T is an area in which the opening 22a and the opening 26a overlap each other in a planar view. When the light blocking layer 32 is provided in the display area E, the light blocking portion S is configured by the light blocking layer 22, the light blocking layer 26, and the light blocking layer 32, and the opening T becomes an area in which the opening 22a, the opening 26a, and the opening of the light blocking layer 32 overlap each other in a planar view.

A straight line that divides the opening T in the X direction into two areas with the same area as each other, is referred to as HL. The HLs are straight lines that pass through central portions of the opening T in the Y direction and are parallel to each other in the X direction. In addition, a straight line that divides the openings T in the Y direction into two areas with the same area as each other, is referred to as VL. The VLs are straight lines that pass through central portions of the openings T in the X direction and are parallel to each other in the Y direction. In the present embodiment, the straight line HL and the straight line VL both pass through together the center Pc of the pixel P.

The center of gravity Tc in the design of the opening T is the center of mass when the mass is uniformly distributed around the opening T, and can be determined as an intersecting point of the straight line HL and the straight ling VL. In the present embodiment, since the opening T has an outline shape that is line-symmetric with respect to the straight line in the X direction and the straight line in the Y direction, the center of gravity Tc of the opening T is disposed so as to overlap the center Pc of the pixel P in a planar view.

As illustrated by a dashed line in FIG. 4, each of the plurality of microlenses ML1 (concave portion 12) and each of the plurality of microlenses ML2 (convex portion 16) are arranged with the same disposition pitch in correspondence to each of the plurality of pixels P. Thus, the microlenses ML1 (concave portion 12) and the microlenses ML2 (convex portion 16) are arranged so as to overlap each other in a planar view. The microlenses ML1 (concave portion 12) and the microlenses ML2 (convex portion 16) have an approximately rectangular flat surface shape. The microlenses ML1 (concave portion 12) and the microlenses ML2 (convex portion 16) are shaped to have a magnitude that is inscribed in the pixel P.

The microlenses ML1 (concave portion 12) adjacent to each other in the X direction and the Y direction are connected to each other, the microlenses ML2 (convex portion 16) adjacent to each other in the X direction and the Y direction are connected to each other, and boundaries thereof are disposed in areas which overlaps a portion extending in the X direction and a portion extending in the Y direction of the light blocking portion S in a planar view. In addition, four corners of the microlens ML1 (concave portion 12) and the microlens ML2 (convex portion 16) are disposed in portions in which a portion extending the X direction and a portion extending in the Y direction of the light blocking portion S intersect each other.

It is preferable that the four corners of the microlenses ML1 (concave portion 12) be formed to be round. That is, it is preferable that the microlenses ML1 (concave portion 12) adjacent to each other in a direction (W direction) along the diagonal lines DLa and DLb be separated from each other. The four corners of the microlenses ML2 (convex portion 16) may not be formed to be round. That is, the microlenses ML2 (convex portion 16) adjacent to each other in a direction (W direction) along the diagonal lines DLa and DLb may be connected to each other.

A position in the design of the planar center Lc1 of the microlens ML1 (concave portion 12) and the planar center Lc2 of the microlens ML2 (convex portion 16) is disposed so as to overlap the center of gravity Tc in the design of the opening T in a planar view. Thus, in the present embodiment, the centers Lc1 and Lc2 of the microlenses ML1 and ML2 are disposed so as to overlap the center Pc of the pixel P in a planar view. In the areas of the microlenses ML1 and ML2, density of light is high in the vicinity of the centers Lc1 and Lc2.

Here, as described in the example in FIG. 17, in the liquid crystal device of the related art, outlines of the microlenses ML1 and ML2 are smaller than those of the pixel P, the microlenses ML1 and ML2 adjacent to each other are separated from each other in the X direction and the Y direction, and the opening T of the pixel P has an outline shape that is non-line-symmetric with respect to the straight line in the X direction and the straight line in the Y direction.

As described in the example in FIG. 17, if the microlenses ML1 and ML2 adjacent to each other are separated from each other, the light that is incident between the microlenses ML1 adjacent to each other and between the microlenses ML2 adjacent to each other is not led to the inside of the opening T, and thus utilization efficiency of light is decreased. In addition, if the centers Lc1 and Lc2 of the microlenses ML1 and ML2 with a high light density are disposed so as to overlap the center Pc of the pixel P in a planar view, with respect to the opening T having the non-line-symmetric outline shape, there is a possibility that a distribution of brightness in the opening T may deviated.

In the liquid crystal device 1 according to the first embodiment, the microlenses ML1 and ML2 adjacent to each other are connected to each other in the X direction and the Y direction, more incident light can be led to the inside of the opening T, and thus utilization efficiency of light can be improved compared to the example illustrated in FIG. 17. In addition, since the opening T has an outline shape that is line-symmetric with respect to the straight line in the X direction and the straight line in the Y direction, there is little deviation in distribution of brightness in the opening T, compared to the example of FIG. 17.

Fabricating Method of Electro-Optic Device

Next, a fabricating method of the liquid crystal device 1 according to the first embodiment will be described. The fabricating method of the liquid crystal device 1 includes a first step of forming the element substrate 20, a second step of forming the counter substrate 30, and a third step of bonding the element substrate 20 to the counter substrate 30. The second step includes a step of forming the microlens array substrate 10.

In the first step, as illustrated in FIG. 3, the light blocking layer 22, the insulating layer 23, the TFT 24, the insulating layer 25, the light blocking layer 26, the insulating layer 27, the pixel electrode 28, and the orientation film 29 are sequentially formed on the substrate 21 using a known method, and thereby the element substrate 20 is obtained.

While not illustrated, in the substrate 21, a mark that is a reference of a position at the time of forming the light blocking layers 22 and 26, and a mark that is a reference for positioning at the time of bonding the element substrate 20 to the counter substrate 30, are formed of, for example, a polysilicon, a metal, a metal compound, or the like. For example, the marks are formed in the periphery of the substrate 21. The marks may be individually formed, and may be formed as the same mark.

Next, in the second step, the microlens array substrate 10 is first formed. Hereinafter, a fabricating method of the microlens array substrate 10 will be described. FIGS. 5A to 5E and FIGS. 6A to 6E are schematic cross-sectional views illustrating the fabricating method of the microlens array substrate according to the first embodiment. Specifically, each figure of FIGS. 5A to 5E and FIGS. 6A to 6E corresponds to schematic cross-sectional views taken along a line III-III of FIG. 3, and a vertical direction (Z direction) thereof is reversed from that of FIG. 3.

Figure 5A:
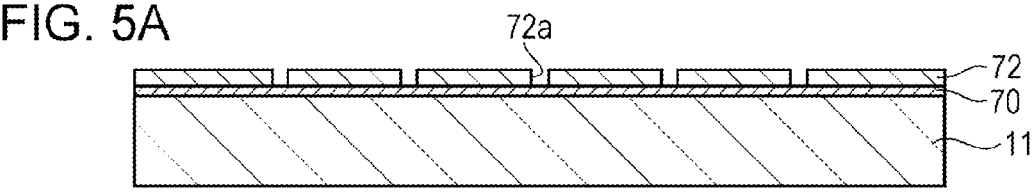
FIGS. 5A to 5E are schematic cross-sectional views illustrating a fabricating method of a microlens array substrate according to the first embodiment.

As illustrated in FIG. 5A, a control film 70 that is formed of an oxide film such as $SiO_2$ is formed on an upper surface of the substrate 11 with optical transmissivity that is formed of quartz. The control film 70 has an etching rate of isotropic etching different from that of the substrate 11, and has a function of adjusting an etching rate in a width direction (W direction, X direction, and Y direction that are illustrated in FIG. 4) with respect to an etching rate in a depth direction (Z direction) at the time of forming the concave portion 12.

After the control film 70 is formed, annealing of the control film 70 is performed at a predetermined temperature. An etching rate of the control film 70 is changed by the temperature at the time of annealing. Thus, by appropriately setting the temperature at the time of annealing, the etching rate of the control film 70 can be adjusted.

Next, a mask layer 72 is formed on the control film 70. Then, the mask layer 72 is patterned, and an opening 72a is formed in the mask layer 72. A position of a planar center of the opening 72a becomes a center Lc of a concave portion 12 to be formed. Subsequently, isotropic etching is performed in the substrate 11 that is covered with the control film 70, via the opening 72a of the mask layer 72. While not illustrated, an opening is formed in an area that overlaps the opening 72a of the control film 70 by the isotropic etching, and the substrate 11 is etched via the opening.

In the isotropic etching, an etching solution (for example, hydrofluoric acid solution) is used such that the etching rate of the control film 70 is higher than the etching rate of the substrate 11. Accordingly, an etching amount per unit time of the control film 70 in the isotropic etching becomes higher than the etching amount per unit time of the substrate 11, and thus according to an expansion of the opening formed in the control film 70, the etching rate in a width direction of the substrate 11 becomes higher than the etching rate in a depth direction.

Figure 5B:
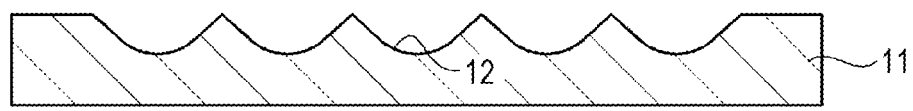

The control film 70 and the substrate 11 are etched from the opening 72a by the isotropic etching, and as illustrated in FIG. 5B, the concave portion 12 is formed in the substrate 11. By setting of the etching rate described above, the concave portion 12 expands more in a width direction than a depth direction, and a tapered inclined surface is formed in the periphery of the concave portion 12. FIG. 5B illustrates a state where the mask layer 72 and the control film 70 are removed.

In the present step, the concave portions 12 adjacent to each other in the X direction and the Y direction are connected to each other, and the isotropic etching is ended in a state where the concave portions 12 adjacent to each other in the W direction are separated from each other (refer to FIG. 4). If isotropic etching is performed until the concave portions 12 adjacent to each other in the W direction are connected to each other, there is a possibility that the mask layer 72 may rise above and peel off from the substrate 11. In the present embodiment, in a state where an upper surface of the substrate 11 remains between the concave portions 12 adjacent to each other, the isotropic etching is ended, and thus the mask layer 72 can be supported until the isotropic etching is ended. Accordingly, a planar shape of the concave portion 12 becomes an approximately rectangular shape having four round corners.

Figure 5C:
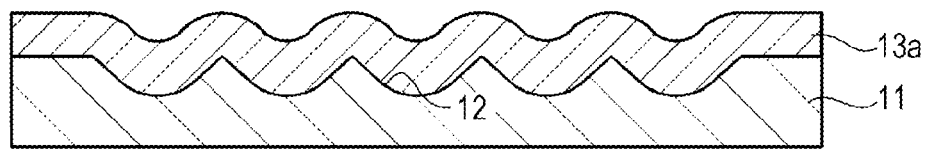

Next, as illustrated in FIG. 5C, a lens material layer 13a is formed by accumulating an inorganic material with optical transmissivity and an optical refractive index higher than that of the substrate 11 in the concave portion 12, so as to fill the concave portions 12 that covers an upper surface side of the substrate 11. The lens material layer 13a can be formed using, for example, a CVD method. Since the lens material layer is formed so as to fill the concave portion 12, a surface of the lens material layer 13a becomes a concavo-convex shape in which concavities and convexities caused by the concave portion 12 of the substrate 11 are reflected.

Figure 5D:
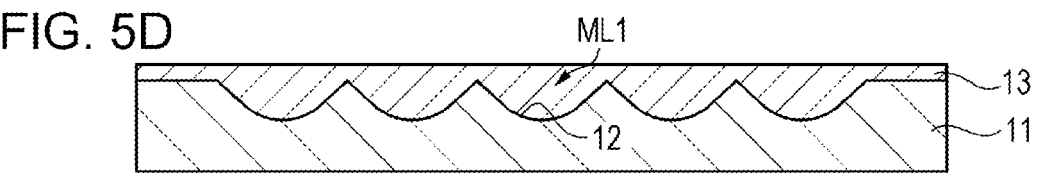

Next, as illustrated in FIG. 5D, a planarizing processing is performed with respect to the lens material layer 13a. In the planarizing processing, using, for example, chemical mechanical polishing (CMP) or the like, a portion in which the concavities and convexities of an upper layer of the lens material layer 13a are formed is ground and removed, and thereby the upper layer is planarized and the lens layer 13 is formed. Then, the concave portion 12 is filled with the material of the lens layer 13, and thereby the microlens ML1 is configured.

Figure 5E:
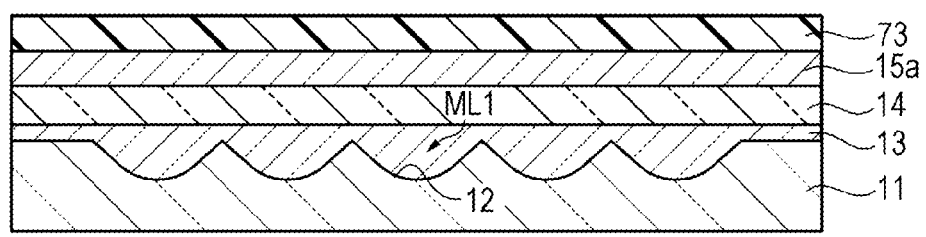

Next, as illustrated in FIG. 5E, an intermediate layer 14 is formed by accumulating an inorganic material with light transmissivity, for example, having the same optical refractive index as that of the substrate 11, so as to cover the lens layer 13. Then, a lens material layer 15a is formed by accumulating an inorganic material with light transmissivity, for example, having a higher optical refractive index than that of the substrate 11, so as to cover an upper surface side of the intermediate layer 14. The intermediate layer 14 and the lens material layer 15a can be formed using, for example, a CVD method.

Then, a resist layer 73 is formed on the lens material layer 15a. For example, the resist layer 73 is formed of a positive photosensitive resist in which an exposed portion is removed by development. The resist layer 73 can be formed using a spin coating method, a roll coating method, or the like. Then, while not illustrated, the resist layer 73 is exposed and developed via the mask in which the light blocking portion is provided in correspondence to the position in which the convex portion 16 is formed.

Figure 6A:
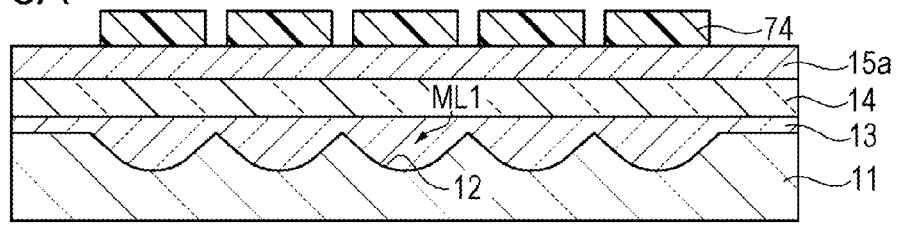
FIGS. 6A to 6E are schematic cross-sectional views illustrating a fabricating method of the microlens array substrate according to the first embodiment.

By exposing and developing the resist layer 73, as illustrated in FIG. 6A, an area other than the area that overlaps the light blocking portion of the mask is exposed and removed, in the resist layer 73, and then a portion 74 corresponding to a position in which a convex portion 16 is formed by a later step remains. Thus, the remaining portions 74 are separated from each other in the X direction, the Y direction, and the W direction. A planar shape of the portion 74 is, for example, an approximately rectangular shape.

Figure 6B:
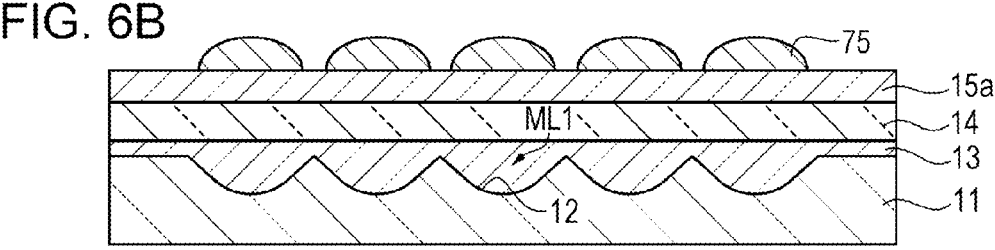

Next, a heating processing such as reflow processing is performed for the portions 74 remaining from the resist layer 73, thereby softening (melting) the portions. The melted portion 74 is in a fluid state, and a surface thereof is deformed into a curved shape by the action of a surface tension. Accordingly, as illustrated in FIG. 6B, a convex portion 75 of an approximately spherical shape is formed on the lens material layer 15a from the remaining portion 74. A bottom side (lens material layer 15a side) of the convex portion 75 is an approximately rectangular shape in a planar view, but a tip side (upper side) of the approximately spherical shape of the convex portion 75 is formed in a concentric circle shape in a planar view.

As a method of processing into the shape of the convex portion 75, a method other than the method of performing the heating processing may be used. For example, it is possible to process the resist layer 73 into a layer with the shape of the convex portion 75 using a method of exposing using a gray scale mask or area gradation mask, a method of exposing in multi stages, or the like, in the resist layer 73 illustrated in FIG. 5E.

Figure 6C:
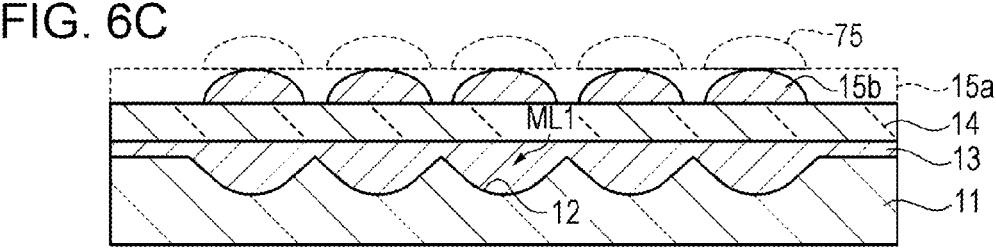

Next, as illustrated in FIG. 6C, with respect to the convex portion 75 and the lens material layer 15a, an anisotropic etching such as dry etching is performed from the top. Accordingly, the convex portion 75 formed of a resist is gradually removed, and according to the removal of the convex portion 75, a portion to be exposed in the lens material layer 15a is etched. Accordingly, a shape of the convex portion 75 is transferred to the lens material layer 15a, and the convex portion 15b is formed.

In the present processes, conditions are used, in which the etching rate of the material (resist) of the convex portion 75 can be approximately the same as the etching rate of the material of the lens material layer 15a, inanisotropic etching, and thereby it is possible to form the convex portion 75 and the concave portion 15b in the same shape as each other. The convex portions 15b are separated from each other in the X direction, the Y direction, and the W direction.

Figure 6D:
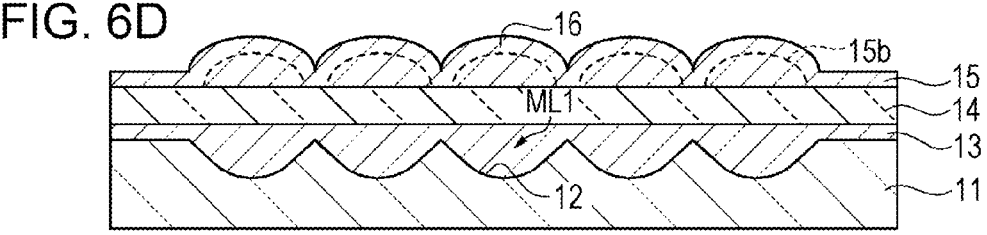

Next, as illustrated in FIG. 6D, the same material as the convex portion 15b (lens material layer 15a) is accumulated so as to cover the intermediate layer 14 and the convex portion 15b, using, for example, a CVD method. As a result, a lens layer 15 having a convex portion 16 corresponding to the convex 15b is formed. As a result, the convex portions 16 adjacent to each other in the X direction, the Y direction, and the W direction are connected to each other.

Figure 6E:
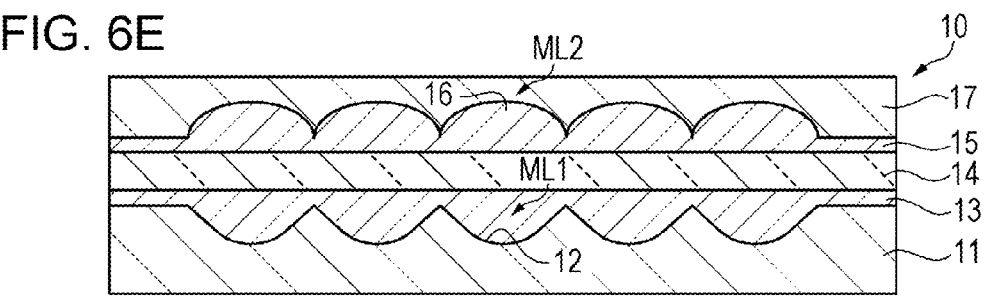

Next, as illustrated in FIG. 6E, the planarizing layer 17 is formed by accumulating an inorganic material with optical transmissivity, for example, having the same optical refractive index as that of the substrate 11, so as to cover the lens layer 15. Then, a planarizing processing is performed with respect to the planarizing layer 17. By covering the convex portion 16 with the planarizing layer 17, the microlens ML2 is configured. As described above, the microlens array substrate 10 is completed.

In the second process, the microlens array substrate 10 is completed, and thereafter, the light blocking layer 32, the protection layer 33, the common electrode 34, and the orientation film 35 are sequentially formed on the microlens array substrate 10, using a known technology, and thereby the counter substrate 30 is obtained.

While not illustrated, in the substrate 11, a mark that is a reference of a position at the time of forming the microlens ML1 (concave portion 12) and the microlens ML2 (convex portion 16), and a mark that is a reference of a position at the time of bonding the element substrate 20 to the counter substrate 30, are formed of, for example, polysilicon, a metal, a metal compound, or the like. For example, the marks may be formed in the periphery of the substrate 11. The marks may be individually formed, and may be formed as the same mark.

Next, in a third process, a positional determination of the element substrate 20 and the counter substrate 30 is performed by using the above-described mark as a reference, and an adhesive with a thermosetting property or a photocurable property is disposed between the element substrate 20 and the counter substrate 30, as the sealing material 42 (refer to FIG. 1), is cured, and is used for bonding. Then, a liquid crystal is inserted in a space that is formed by the element substrate 20, the counter substrate 30, and the sealing material 42, and is interposed therebetween, and thereby the liquid crystal device 1 is completed. Before the element substrate 20 is bonded to the counter substrate 30, the liquid crystal may be disposed in an area surrounded by the sealing material 42.

However, due to variation or the like in fabricating at the time of forming the microlens ML1 (concave portion 12) and the microlens ML2 (convex portion 16), there is a case in which the microlens ML1 and the microlens ML2 are shifted in directions different from each other with respect to the above-described mark. That is, there is a case in which a position of the center Lc1 of the microlens ML1 and a position of the center Lc2 of the microlens ML2 are shifted in directions different from each other with respect to the position in the design illustrated in FIG. 4. Such a shift can occur depending on, for example, an exposure accuracy of an exposure machine, a disposition accuracy of a mask, or the like. In addition, there is also a case in which a group shift may occur at the time of bonding the element substrate 20 to the counter substrate 30. When the position shift occurs, the center Lc1 of the microlens ML1 and the center Lc2 of the microlens ML2 may be shifted in directions relatively different from each other, with respect to the center of gravity Tc in the design of the opening T.

Correction Method of Position Shift

Herein, in the fabricating method of the liquid crystal device 1 according to the first embodiment, when a relative position shift between the microlens ML1 and the microlens ML2 occurs with respect to the opening T, it is possible to correct the position shift. Hereinafter, a method of correcting a position shift in the fabricating method of the liquid crystal device 1 according to the first embodiment will be described.

Figure 7:
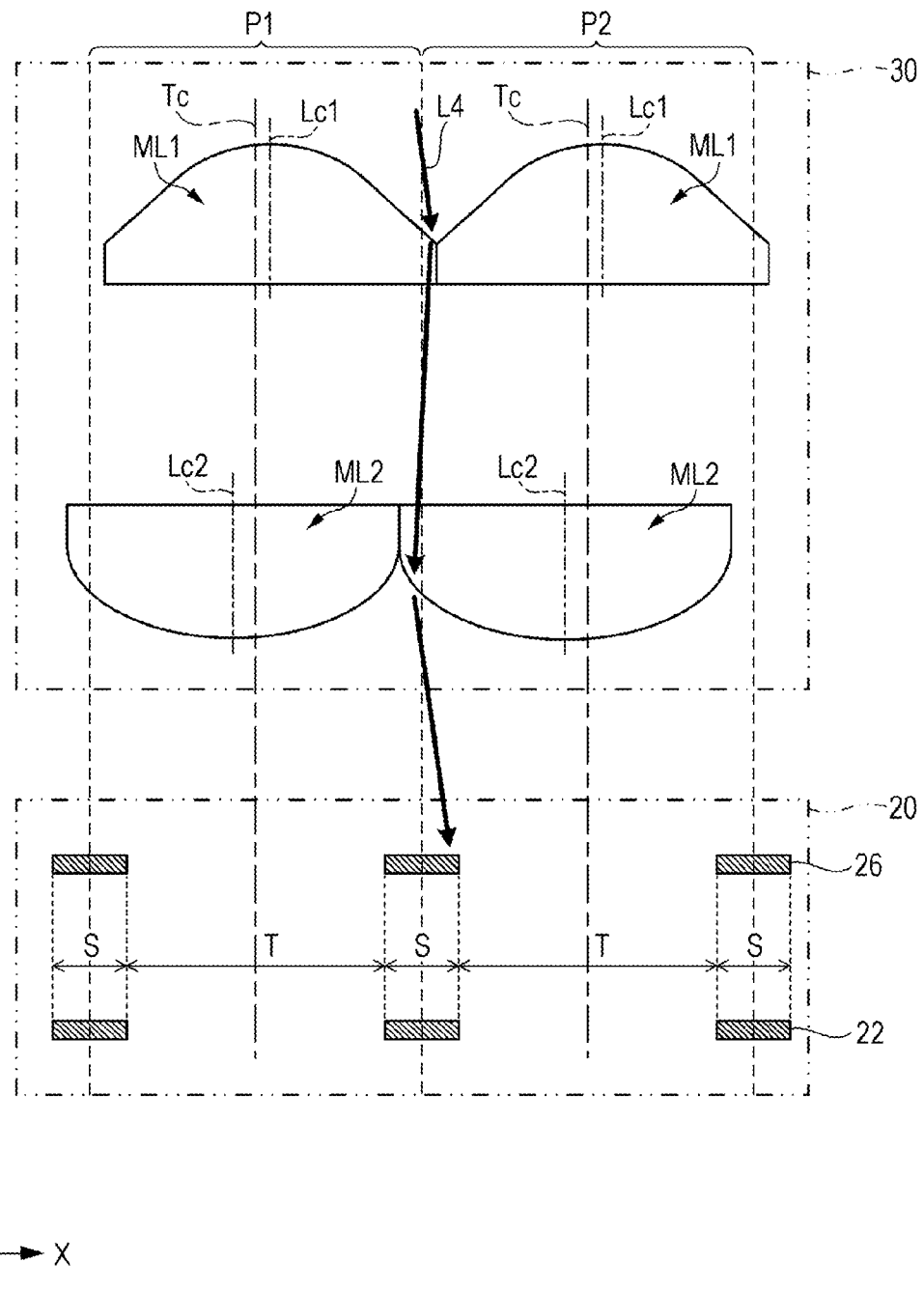
FIG. 7 is a schematic cross-sectional view illustrating a case in which a position shift occurs in microlenses of two stages.
Figure 8:
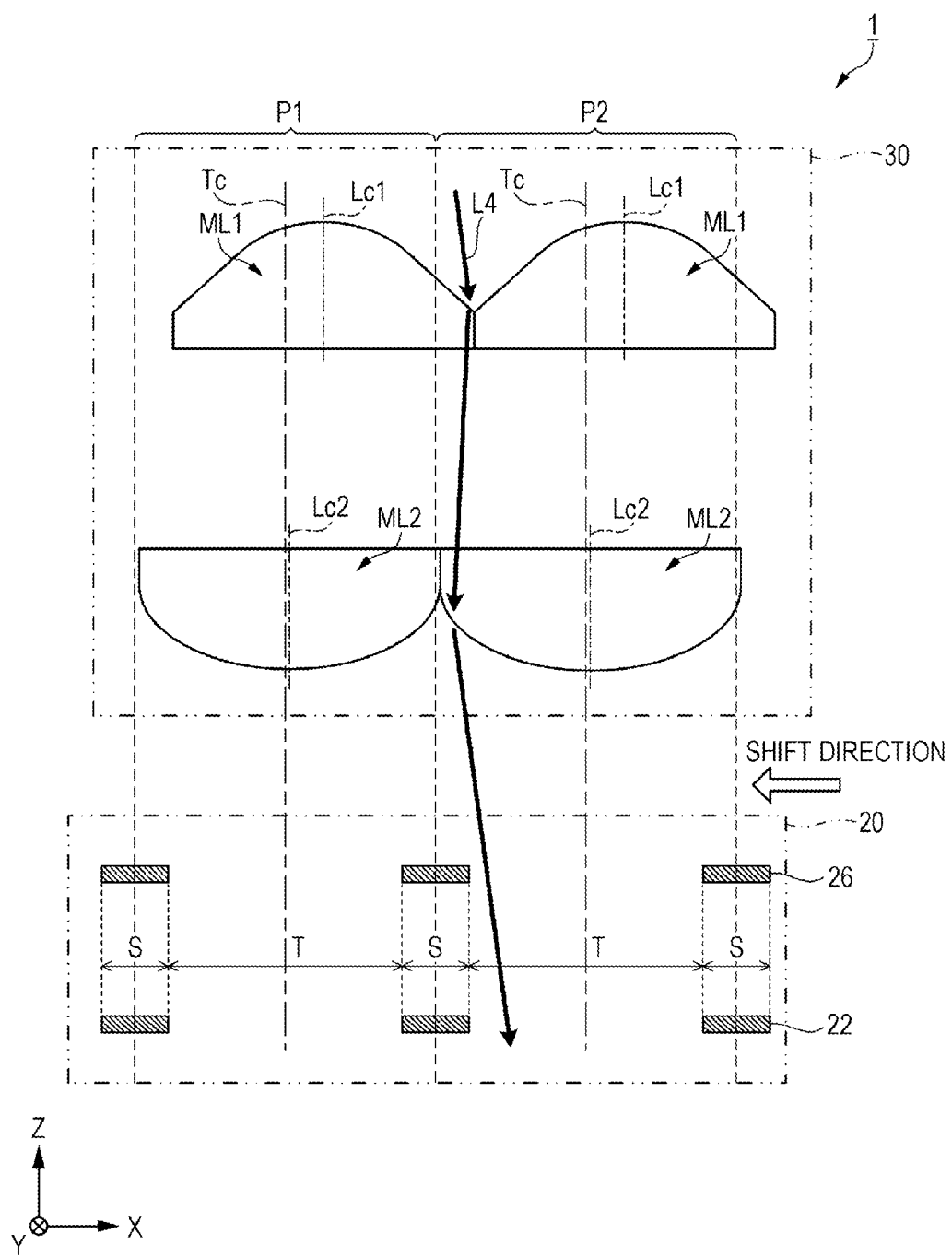
FIG. 8 is a schematic cross-sectional view illustrating a correction method of a position shift according to the first embodiment.

FIG. 7 is a schematic cross-sectional view illustrating a case in which a position shift occurs in the microlenses of two stages. FIG. 8 is a schematic cross-sectional view illustrating a correction method of a position shift according to a first embodiment. FIG. 7 and FIG. 8 correspond to schematic cross-sectional views cut along a line III-III of FIG. 3, but elements other than essential configuration elements are not illustrated.

In FIG. 7, two pixels P (P1, P2) adjacent to each other are illustrated. In order to identify the two pixels P, the pixel in a −X direction (left) in FIG. 7 is referred to as pixel P1, and the pixel in a +X direction (right) in FIG. 7 is referred to as pixel P2. The center Lc1 of the microlenses ML1 of a first stage is shifted in the +X direction (right) with respect to the center of gravity Tc of the openings T of the pixels P1 and P2. In addition, the center Lc2 of the microlenses ML2 of a second stage is shifted in the −X direction (left) with respect to the center of gravity Tc of the openings T of the pixels P1 and P2. In other words, with respect to an boundary between the pixels P1 and P2 adjacent to each other, the microlens ML1 on the pixel P1 is shifted to the pixel P2 side, and the microlens ML2 on the pixel P2 is shifted to the pixel P1 side.

If light L4 from the counter substrate 30 is obliquely incident on an end portion of the +X direction side (side that is included in pixel P2) in the microlens ML1 on the pixel P1 side, the light L4 is refracted toward the center Lc1 of the microlens ML1. According to an incident angle of the light L4, the refracted light L4 is incident on an end portion of the −X direction side (side that is included in pixel P1) in the microlens ML2 on the pixel P2 side. Then, the light L4 is refracted toward the center Lc2 side of the microlens ML2, and is blocked by the light blocking layer 26 that is disposed in the boundary between the pixels P1 and P2.

While not illustrated, when there is not a shift in both the microlens ML1 and ML2 of two stages, the light L4 is incident on the end portion of the microlens ML1 on the pixel P2 side and then is refracted toward the center Lc1 of the microlens ML1, and is incident on the end portion of the microlens ML2 on the pixel P2 side and then is further refracted toward the center Lc2 of the microlens ML2. Thus, if there is not a shift as illustrated in FIG. 7, the light L4 is not blocked by the light blocking layer 26 and passes through the inside of the opening T.

In this way, if the light L4 originally intended to be led to the inside of the opening T is blocked, the utilization efficiency of light in the liquid crystal device 1 is decreased. In addition, when the light is applied to the light blocking layer 26, the light blocking layer 26 is heated, thereby increasing the internal temperature of the liquid crystal device 1, and thus there is a possibility that the lifespan of the liquid crystal device 1 may be shortened. In order to suppress an increase of the internal temperature of the liquid crystal device 1, if a heat dissipation structure of the liquid crystal device 1 is enhanced, a size and a cost of the liquid crystal device 1 are increased. Furthermore, there is a possibility that the light reflected by the light blocking layer 26 may become stray light, an increase of a light leakage current in the TFT 24, or a malfunction of the TFT 24 may occur, and display quality may decrease.

In the present embodiment, when there is a shift as illustrated in FIG. 7 at the time of positioning the element substrate 20 and the counter substrate 30 in the third process, the element substrate 20 and the counter substrate 30 are disposed such that a relative position thereof is shifted, and thereby the position shift is corrected. More specifically, in a planar view, the element substrate 20 and the counter substrate 30 are disposed, such that the center Lc1 of the microlens ML1 and the center Lc2 of the microlens ML2 are on the same side in at least in one direction of the X direction and the Y direction with respect to the center of gravity Tc in the design of the opening T.

Herein, the center Lc1 of the microlens ML1 and the center Lc2 of the microlens ML2 are corrected so as to be in the X direction with respect to the center of gravity Tc in the design of the opening T. The X direction is a direction along the scan line 2 (FIG. 2). When the relative position of the counter substrate 30 and the element substrate 20 is shifted, a shift direction and a shift amount are adjusted by using the mark provided in the element substrate 20 and the mark provided in the counter substrate 30 as a reference.

In the example illustrated in FIG. 8, a relative position of the element substrate 20 with respect to the counter substrate 30 is aligned by being shifted in the −X direction (left) illustrated by an arrow in FIG. 8. Then, the center Lc1 of the microlens ML1 and the center Lc2 of the microlens ML2 are disposed together in the +X direction (right) of the center of gravity Tc of the opening T. For this reason, in the same manner as in FIG. 7, the light L4 incident on an end portion in the +X direction in the microlens ML1 on the pixel P1 side is refracted toward the center Lc1 side, is incident on an end portion in the +X direction in the microlens ML2 on the pixel P2 side, and is refracted into the center Lc2 side. Thus the light L4 is not blocked by the light blocking layer 26 and passes through the inside of the opening T.

Accordingly, it is possible to suppress a decrease of the utilization efficiency of light in the liquid crystal device 1. In addition, reduction of lifespan caused by an increase of internal temperature of the liquid crystal device 1 due to the light application to the light blocking layer 26 is suppressed and thus it is possible to suppress increases in the size and the cost of the liquid crystal device 1. Furthermore, it is possible to suppress an increase of a light leakage current in the TFT 24 when the light reflected by the light blocking layer 26 becomes stray light, or malfunctioning of the TFT 24, and a decrease of display quality.

Specifically, in the liquid crystal device with a small pitch (size of pixel P) of the pixel P or a small opening ratio (relative magnitude of opening T with respect to pixel P) of the opening T, an influence of the above-described position shift becomes great, and thus by performing a correction of the position shift as described in the present embodiment, a fabrication yield of the liquid crystal device can be increased.

It is preferable that the element substrate 20 and the substrate 30 be disposed such that the center Lc1 of the microlens ML1 and the center Lc2 of the microlens ML2 are on the same side not only in the X direction, but also in both the X direction and the Y direction as described above, with respect to the center of gravity Tc in the design of the opening T. Accordingly, it is possible to lead more light that is blocked by the light blocking layer 26 due to the position shift, to the inside of the opening T.

Figure 9:
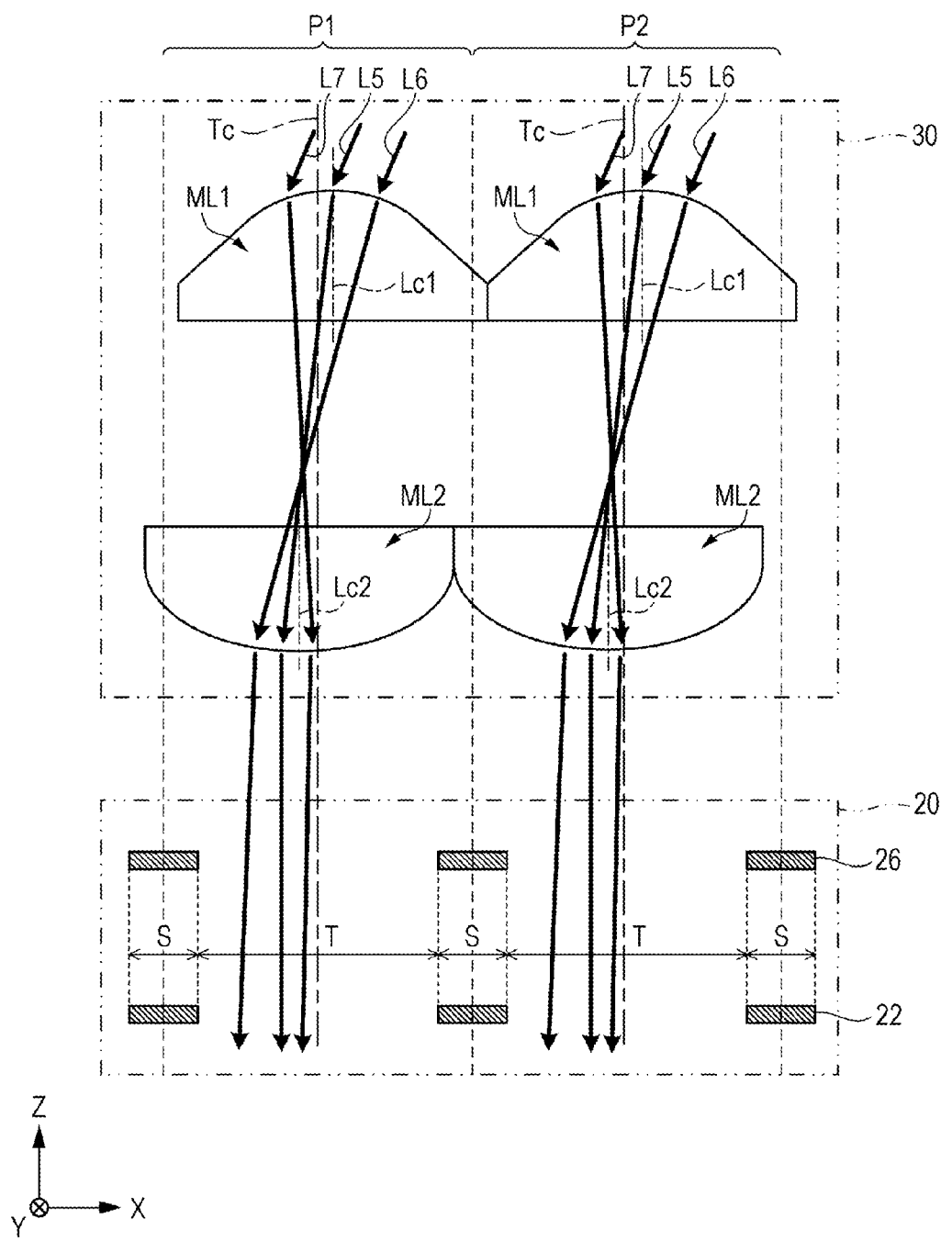
FIG. 9 is a schematic cross-sectional view illustrating a case in which a position shift occurs in microlenses of two stages.
Figure 10:
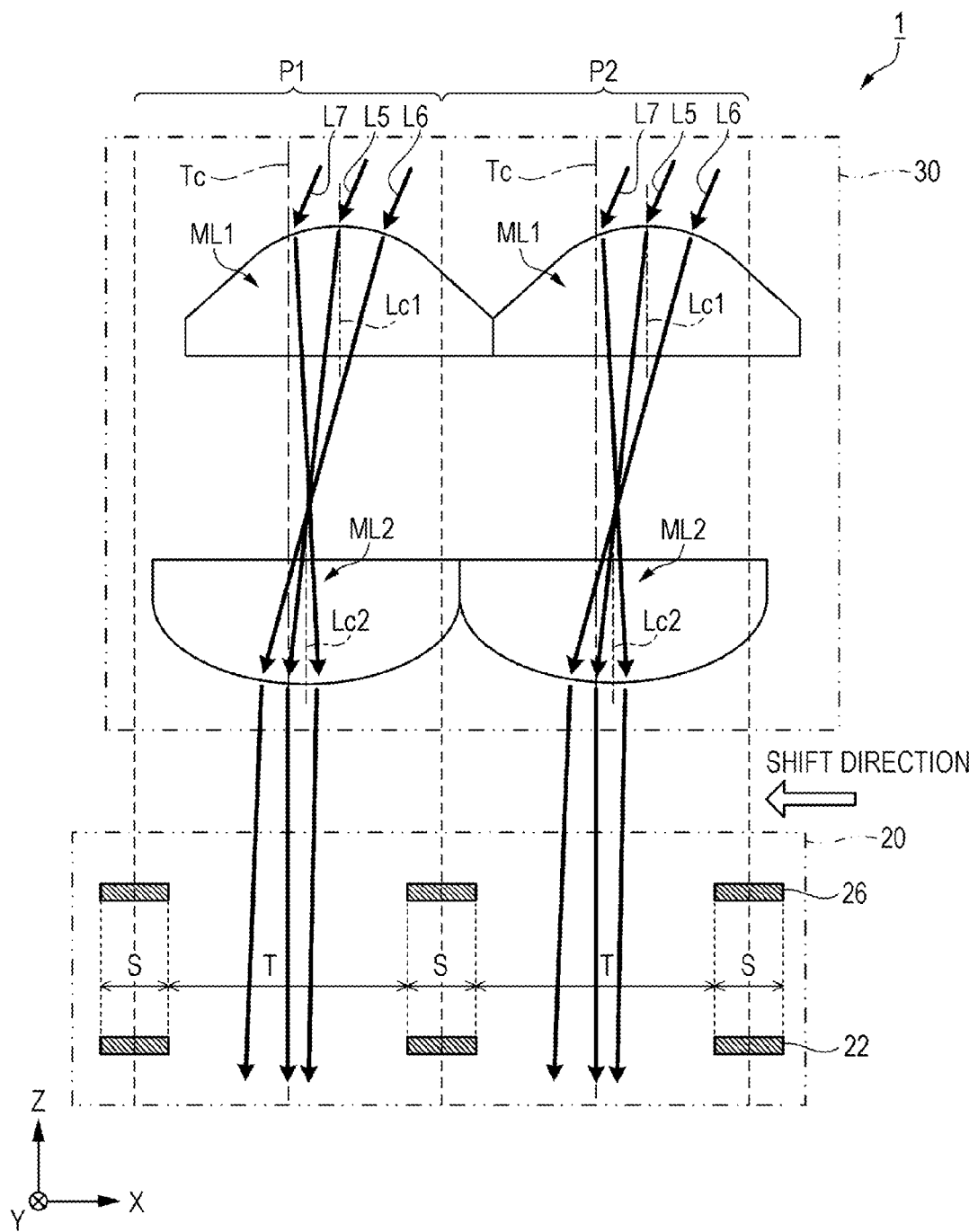
FIG. 10 is a schematic cross-sectional view illustrating a correction method of a position shift according to the first embodiment.

According to the correction method of the position shift of the present embodiment, it is also possible to obtain an effect different from that described above, depending on an incident angle of the incident light. A case in which the incident angle of the incident light is different from that in FIG. 7 and FIG. 8 will be described with reference to FIG. 9 and FIG. 10. FIG. 9 is a schematic cross-sectional view illustrating a case in which a position shift occurs in microlenses of two stages. FIG. 10 is a schematic cross-sectional view illustrating a correction method of a position shift according to the first embodiment.

In FIG. 9, in the same manner as in FIG. 7, the microlens ML1 on the pixel P1 side is shifted toward the pixel P2 side, and the microlens ML2 on the pixel P2 side is shifted toward the pixel P1 side, with respect to an boundary between the pixels P1 and P2 adjacent to each other. Lights L5, L6, and L7 are obliquely incident with respect to a normal direction of a surface of the counter substrate 30, but are approximately parallel to each other.

The light L5 that is incident on the vicinity of the center Lc1 of the microlens ML1 is refracted toward the center Lc1 side, and thereby an angle with resepc to the normal direction becomes small, but is refracted toward a side (−X direction) away from the center Lc1, and is incident on a position in the −X direction further than the center Lc2 of the microlens ML2. Then, since the light L5 is refracted toward the center Lc2 side (+X direction) of the microlens ML2, the angle with respect to the normal direction becomes small, and thereby the light is emitted from the element substrate 20.

The light L6 that is incident on a position in the +X direction further than the center Lc1 of the microlens ML1 has a smaller angle with respect to the normal direction than that at the time of being incident, but intersects the light L5, and is incident on a position in the −X direction further than the light L5 of the microlens ML2. Then, since the light L6 is refracted toward the center Lc2 side (+X direction) of the microlens ML2, the angle with respect to the normal direction becomes small, and thereby the light is emitted from the element substrate 20.

The light L7 that is incident on a position in the −X direction further than the center Lc1 of the microlens ML1 is refracted toward the center Lc1, intersects the light L5, and is incident on a position in the +X direction further than the center Lc2 of the microlens ML2. Then, since the light L7 is refracted toward the center Lc2 side (−X direction) of the microlens ML2, the angle with respect to the normal direction becomes small, and thereby the light is emitted from the element substrate 20.

In this way, by the action of the microlenses ML1 and ML2 of two stages, the lights L5, L6, and L7 that are obliquely incident from the counter substrate 30 have a small angle with respect to the normal direction, thereby being emitted from the element substrate 20, and thus it is possible to decrease the variation of the angle of the light that is emitted from the liquid crystal device 1. However, if being emitted from the microlens ML2, the lights L5, L6, and L7 pass through positions deviated from the center of gravity Tc of the opening T. Thus, there is little deviation in distribution of brightness of the opening T of the pixel P.

In the same manner as in FIG. 8, FIG. 10 illustrates a state where a relative position of the element substrate 20 with respect to the counter substrate 30 is aligned by being shifted in the −X direction illustrated by an arrow. Then, the center Lc1 of the microlens ML1 and the center Lc2 of the microlens ML2 are disposed together in the +X direction of the center of gravity Tc of the opening T. Thus, if emitted from the microlens ML2, the lights L5, L6, and L7 pass through positions closer to the center of gravity Tc of the opening T. Accordingly, it is possible to reduce deviation of the distribution of brightness in the inside of the opening T of the pixel P.

Herein, in the same manner as the example of the liquid crystal device of the related art illustrated in FIG. 17, if the microlenses ML1 and ML2 adjacent to each other are separated from each other in the X direction and the Y direction, when a relative position shift of the microlenses ML1 and ML2 with respect to the opening T occurs, an amount of light passing through the opening T is decreased. In addition, if the opening T of the pixel P has an outline shape that is non-line-symmetric with respect to a straight line in the X direction and a straight line in the Y direction, when the position shift occurs, deviation of the distribution of brightness in the inside of the opening T of the pixel P increases according to a direction or a magnitude of the position shift.

Then, in the example of the liquid crystal device illustrated in FIG. 17, even when the position shift does not occur in the microlens ML1 and the microlens ML2, if a group shift occurs at the time of bonding the element substrate 20 to the counter substrate 30, an amount of light passing through the opening T is decreased, or deviation of the distribution of brightness in the inside of the opening T of the pixel P increases.

In contrast to this, in the liquid crystal device 1 according to the first embodiment, the microlenses ML1 and ML2 adjacent to each other are connected to each other, and the opening T has an outline shape that is line-symmetric with respect to the straight line in the X direction and the straight line in the Y direction. Thus, when a relative position shift of the microlens ML1 and the microlens ML2 with respect to the opening T occurs, or even when a group shift at the time of bonding the element substrate 20 to the counter substrate 30 occurs, it is possible to decrease an amount of light passing through the opening T, or deviation of the distribution of brightness in the inside of the opening T, compared to the liquid crystal device of the related art illustrated in FIG. 17.

Second Embodiment

Electro-Optical Device

Figure 11:
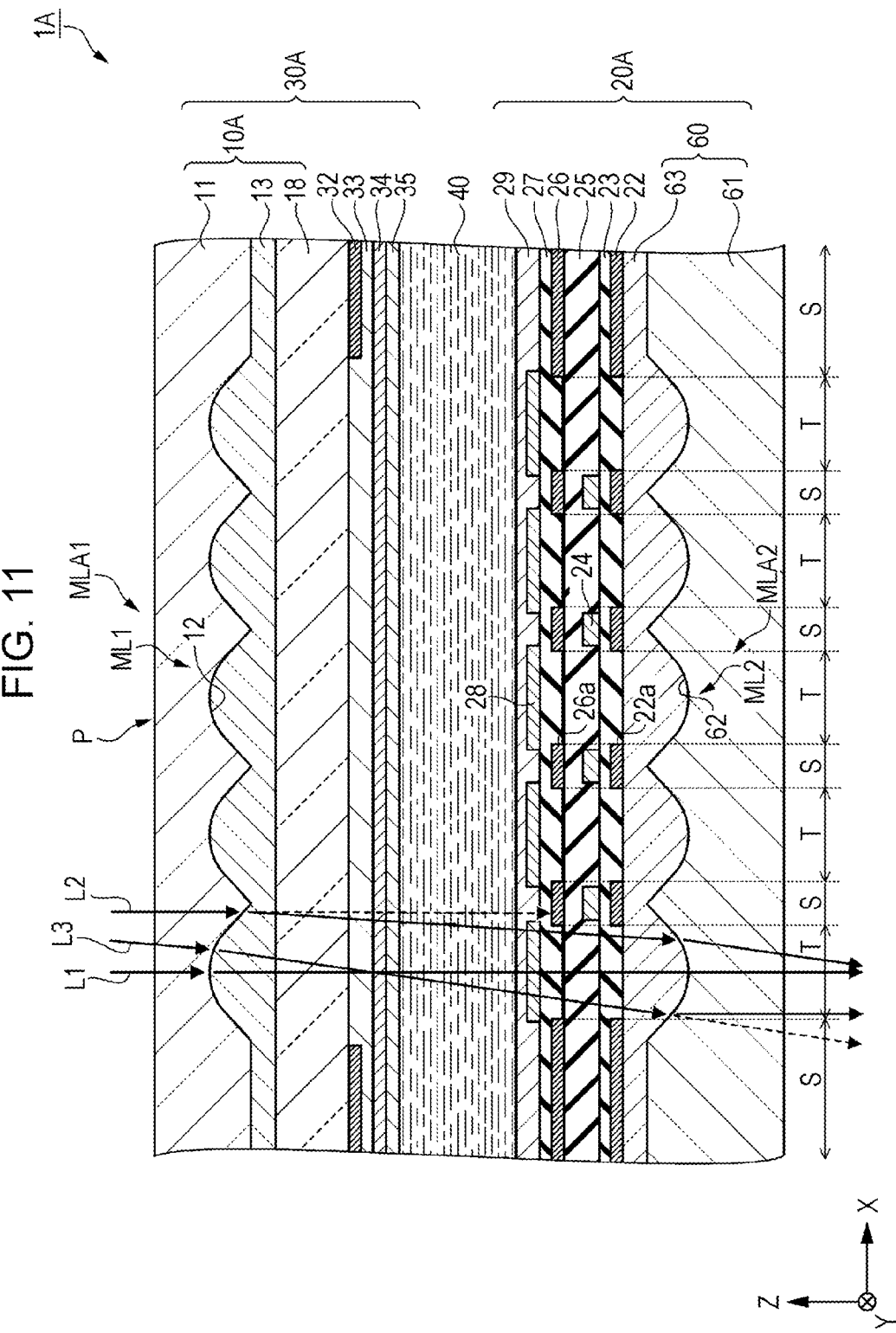
FIG. 11 is a schematic cross-sectional view illustrating a configuration of the liquid crystal device according to a second embodiment.

A liquid crystal device according to a second embodiment is different from that according to the first embodiment in that a microlens of a first stage is included in a counter substrate and a microlens of a second stage is included in an element substrate. FIG. 11 is a schematic cross-sectional view illustrating a configuration of a liquid crystal device according to a second embodiment. The same symbols or reference numerals will be attached to the same configuration elements as in the first embodiment, and description thereof will be omitted.

As illustrated in FIG. 11, a liquid crystal device 1A according to the second embodiment includes an element substrate 20A and a counter substrate 30A, and the liquid crystal layer 40. The counter substrate 30A according to the second embodiment includes a microlens array substrate 10A that includes the microlens ML1 of the first stage, the light blocking layer 32, the protection layer 33, the common electrode 34, and the orientation film 35.

The microlens array substrate 10A includes the substrate 11, the lens layer 13, and an optical path length adjustment layer 18. The optical path length adjustment layer 18 has optical transmissivity and is formed of an inorganic material with a lower optical refractive index than the lens layer 13, for example, an optical refractive index which is approximately equal to that of the substrate 11. The optical path length adjustment layer 18 has a function to adjust a distance between the microlens ML1 and the light blocking layer 26, to a desired value.

An element substrate 20A according to the second embodiment includes a microlens array substrate 60 having the microlens ML2 of a second stage, the light blocking layer 22, the insulating layer 23, the TFT 24, the insulating layer 25, the light blocking layer 26, the insulating layer 27, the pixel electrode 28, and the orientation layer 29. The microlens array substrate 60 includes a substrate 61 and a lens layer 63. The substrate 61 is formed of a material with optical transmissivity, such as glass or quartz.

The substrate 61 has a plurality of concave portions 62 that is formed on a surface on the liquid crystal layer 40 side. Each concave portion 62 is provided in correspondence to the pixel P, and has the same cross-sectional shape as the concave portion 12 that configures the microlens ML1. The lens layer 63 is formed more thickly than a depth of the concave 62, so as to cover the substrate 61 by filling the concave portion 62. The lens layer 63 is formed of the same material as, for example, that of the lens layer 13, and is formed of an inorganic material with a higher optical refractive index than that of the substrate 61. A surface of the lens layer 63 is approximately planar surface. By filling the concave portion 62 with the material forming the lens layer 63, the microlens ML2 with a convex shape as the second microlens is configured.

In the liquid crystal device 1A according to the second embodiment, for example, the light that is emitted from an optical source is incident from the counter substrate 30A (microlens array substrate 10A) side including the microlens ML1. From the light that are incident from the substrate 11, the light L1 that is incident on the center Lc1 (refer to FIG. 13) of the microlens ML1 in the normal direction travels in a straight line and passes through the inside of the opening T of the pixel P. Then, the light L1 is incident on the center Lc2 (refer to FIG. 13) of the microlens ML2, travels in a straight line as it is, and is emitted toward the element substrate 20A side.

The light L2 that is incident on an end portion of the microlens ML1 in the normal direction, if travelling in a straight line as it is, is blocked by the light blocking layer 26 as illustrated by a dashed line. However, by a difference of the optical refractive index (positive refractive power) between the substrate 11 and the lens layer 13, the light L2 is refracted toward the center Lc1 side of the microlens ML1 and passes through the inside of the opening T of the pixel P. Then, the light L2 incident on the microlens ML2 is further refracted toward the center Lc2 side of the microlens ML2 and emitted toward the element substrate 20A side, by a difference of the optical refractive index (positive refractive power) between the lens layer 63 and the substrate 61.

The light L3 that is incident on an end portion of the microlens ML1 in an oblique manner with respect to the normal direction and is incident toward the center Lc1 side of the microlens ML1, is refracted toward the center Lc1 side of the microlens ML1 and passes through the inside of the opening T of the pixel P. Then, if travelling in a straight line as it is, the light is separated from the center Lc2 of the microlens ML2 and then is diffused as illustrated by a dashed line. However, by a difference of the optical refractive index between the lens layer 63 and the substrate 61, the light is refracted toward the center Lc2 side of the microlens ML2 and then is emitted toward the element substrate 20A due to a small angle with respect to the normal direction.

In this way, in the liquid crystal device 1A, by the action of the microlenses ML1 and ML2 of the two stages, the light L2 which is blocked by the light blocking layer 26 when travelling in a straight line as it is, is refracted toward the centers Lc1 and Lc2, and can pass through the inside of the opening T of the pixel P. Thus, it is possible to increase utilization efficiency of light. In addition, it is possible to make the light L3 that is diffused when travelling in a straight line as it is, as approximately parallel light, and thus, for example, when the liquid crystal device 1A is used for an electronic apparatus such as a projector, it is possible to increase utilization efficiency of light of the electronic apparatus.

Fabricating Method of Electro-Optical Device

Next, a fabricating method of the liquid crystal device 1A according to the second embodiment will be described. The fabricating method of the liquid crystal device 1A includes a first step of forming the element substrate 20A, a second step of forming the counter substrate 30A, and a third step of bonding the element substrate 20A to the counter substrate 30A. The first step includes a step of forming the microlens array substrate 60, and the second step includes a step of forming the microlens array substrate 10A. Hereinafter, points different from the first embodiment will be described.

In the first process, the microlens array substrate 60 is formed in the same manner as the processes (FIGS. 5A to 5D) of forming the microlens ML1 according to the first embodiment. Then, the light blocking layer 22, the insulating layer 23, the TFT 24, the insulating layer 25, the light blocking layer 26, the insulating layer 27, the pixel electrode 28, and the orientation film 29 are sequentially formed on the microlens array substrate 60, using the known method, and thereby the element substrate 20A is obtained.

In the second process, the microlens array substrate 10A is formed in the same manner as the processes (FIGS. 5A to 5D) of forming the microlens ML1 according to the first embodiment, and the optical path length adjustment layer 18 is formed on the microlens array substrate 10A (lens layer 13) using the same method as that of forming the intermediate layer 14. Then, the light blocking layer 32, the protection layer 33, the common electrode 34, and the orientation film 35 are sequentially formed on the microlens array substrate 10A, and thereby the counter substrate 30A is obtained.

Correction Method of Position Shift

Figure 12:
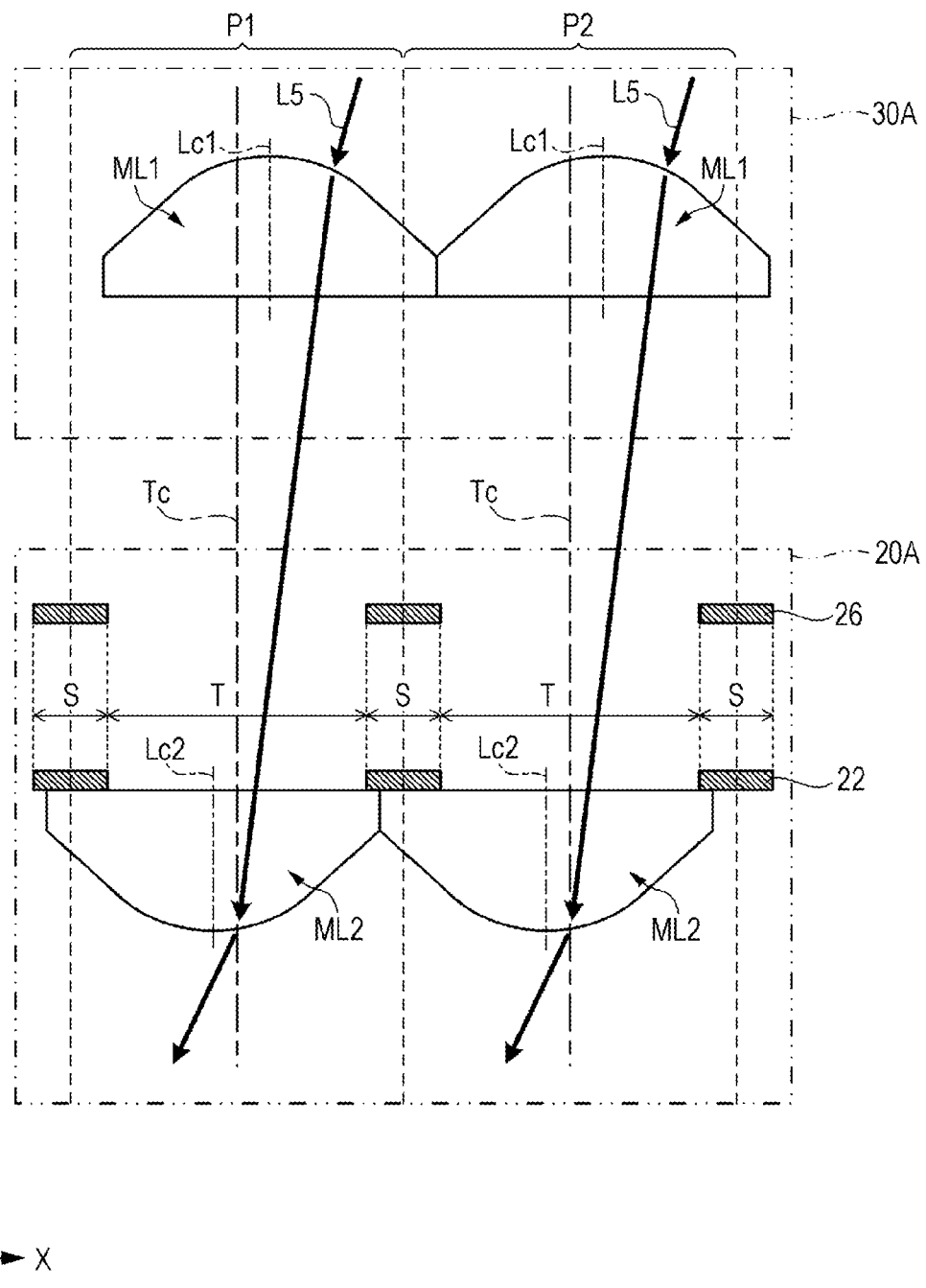
FIG. 12 is a schematic cross-sectional view illustrating a case in which a position shift occurs in microlenses of two stages.
Figure 13:
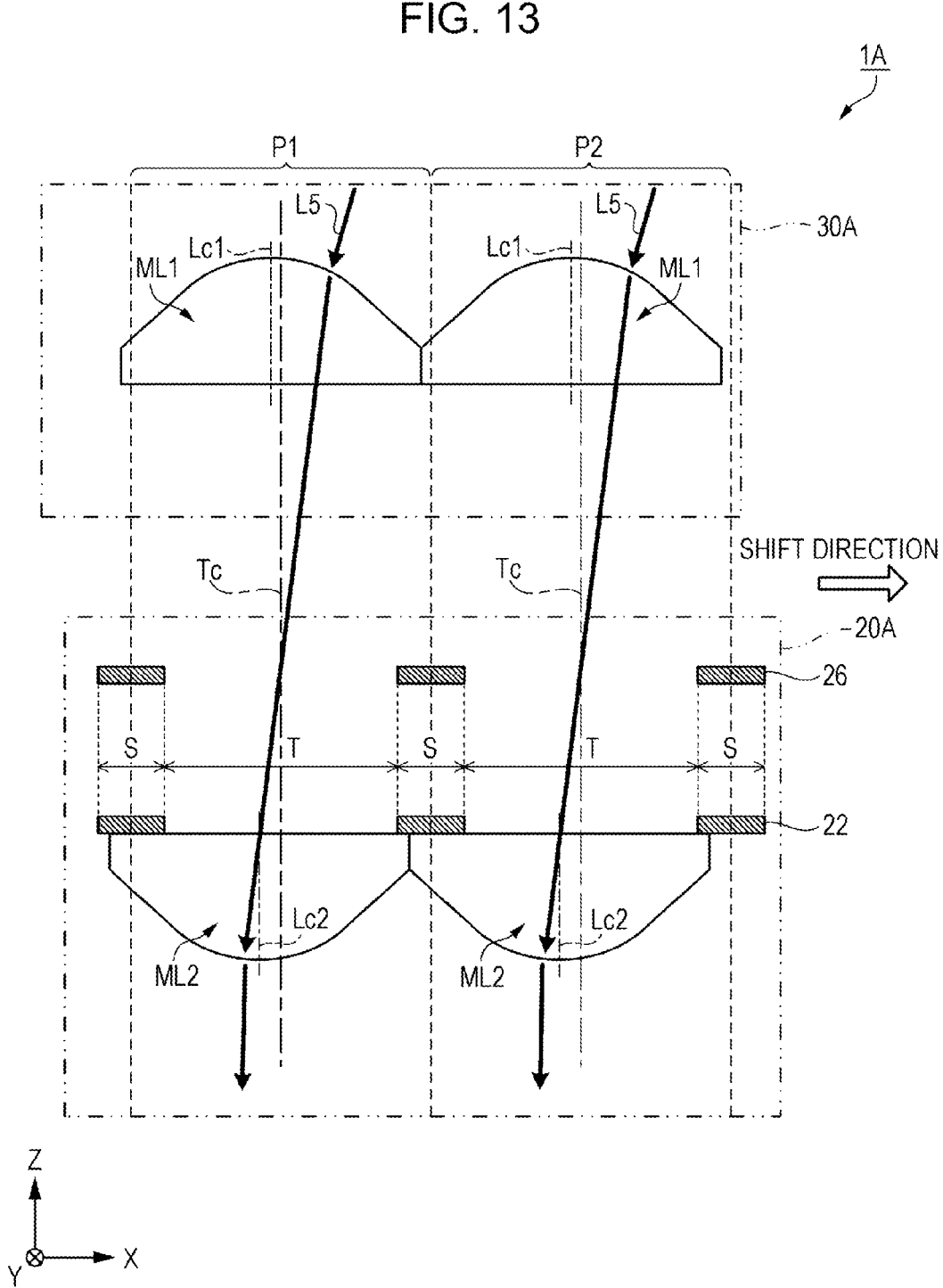
FIG. 13 is a schematic cross-sectional view illustrating a correction method of a position shift according to the second embodiment.

Next, in a fabricating method of the liquid crystal device 1A according to the second embodiment, when a relative position shift between the microlens ML1 and the microlens ML2 occurs with respect to the opening T, a method of correcting the position shift will be described. FIG. 12 is a schematic cross-sectional view illustrating a case in which a position shift occurs in the microlenses of two stages. FIG. 13 is a schematic cross-sectional view illustrating a correction method of a position shift according to a second embodiment. FIG. 12 and FIG. 13 correspond to a schematic cross-sectional views cut along a line III-III in FIG. 3, but elements other than essential configuration elements are not illustrated.

In FIG. 12, two pixels P1 and P2 adjacent to each other are illustrated. The center Lc1 of the microlens ML1 of a first stage is shifted toward the +X direction side with respect to the centers Tc of the openings T of the pixels P1 and P2. In addition, the center Lc2 of the microlens ML2 of a second stage is shifted toward the -X direction side with respect to the centers Tc of the openings T of the pixels P1 and P2. In other words, with respect to an boundary between the pixels P1 and P2 adjacent to each other, the microlens ML1 on the pixel P1 side is shifted toward the pixel P2 side and the microlens ML2 on the pixel P2 side is shifted toward the pixel P1 side.

If the light L5 from the counter substrate 30A side is obliquely incident toward the +X direction side further than the center Lc1 of the microlens ML1 on the pixel P1 side, the light L5 has a small angle with respect to the normal direction, thus being refracted toward the center Lc1 side (-X direction side) of the microlens ML1. According to the incident angle of the light L5, the refracted light L5 is incident toward the +X direction side further than the center Lc2 of the microlens ML2. Then, the light L5 is further refracted toward the center Lc2 side (-X direction side) of the microlens ML2 and then is emitted, and has a large angle with respect to the normal direction thereby being diffused.

For example, when the liquid crystal device 1A is used for an electronic apparatus such as a projector, if the light emitted from the liquid crystal device 1A is diffused in this way and has a large angle with respect to an optical axis of a projection lens, the light is rejected by the projection lens, and thereby utilization efficiency of light of the electronic apparatus is decreased. In addition, the light that is originally projected as an image light is applied to a projection lens unit, and thus, temperature of the projection lens unit increases, thermal expansion occurs, and thereby the projected display image causes a decrease of display quality such as distortion. If a heat dissipation structure of the projection lens unit is strengthened in order to suppress the increase of the temperature of the projection lens unit, a size and a cost of the electronic apparatus are increased.

In the present embodiment, for example, when the shift illustrated in FIG. 12 occurs at the time of positioning the element substrate 20A and the counter substrate 30A in the third process, a relative position of the counter substrate 30A and the element substrate 20A is shifted for the substrate to be disposed. More specifically, the element substrate 20A and the counter substrate 30A are disposed such that, in a planar view, the center Lc1 of the microlens ML1 and the center Lc2 of the microlens ML2 are positioned on the same side (-X direction side) as at least one of the X direction and the Y direction with respect to the center of gravity Tc in the design of the opening T.

In the example illustrated in FIG. 13, a relative position of the counter substrate 30A and the element substrate 20A is adjusted so as to be shifted toward the +X direction side illustrated by an arrow in FIG. 13. Then, the center Lc1 of the microlens ML1 and the center Lc2 of the microlens ML2 are disposed together in the -X direction side of the center of gravity Tc of the opening T. For this reason, if the light L5 is obliquely incident toward the +X direction side further than the center Lc1 of the microlens ML1 in the same manner as in FIG. 12 and is refracted toward the center Lc1 side (-X direction side), the refracted light L5 is incident toward the -X direction side further than the center Lc2 of the microlens ML2. Then, since the light L5 is refracted toward the center Lc2 side (+X direction side) of the microlens ML2, the light is not diffused as illustrated in FIG. 13, and has a small angle with respect to the normal direction, thus being emitted from the element substrate 20A.

Accordingly, it is possible to suppress a decrease of utilization efficiency of light of the electronic apparatus including the liquid crystal device 1A. In addition, since thermal expansion due to a temperature increase of the projection lens unit according to the light that is applied to the projection lens unit, is suppressed, it is possible to suppress a decrease of display quality, and to suppress an increase of a size and a cost of the electronic apparatus.

In the second embodiment, the light blocking layers 22 and 26, the microlens ML2 are provided in the element substrate 20A, and thus a positional relationship between the center of gravity Tc in the design of the opening T and the center Lc2 of the microlens ML2 cannot be corrected. Thus, when the correction of the position shift is performed, it is preferable that the element substrate 20A and the counter substrate 30A be disposed such that the center Lc1 of the microlens ML1 and the center Lc2 of the microlens ML2 have an appropriate positional relationship, using the center of gravity Tc in the design of the opening T as a reference.

More specifically, it is preferable that the correction of the position shift be performed, such that a distance in a planar view between the center Lc1 of the microlens ML1 farther from the light blocking layer 26 in a thickness direction (Z direction) of the liquid crystal device 1A and the center of gravity Tc in the design of the opening T is smaller than a distance in a planar view between the center Lc2 of the microlens ML2 closer to the light blocking layer 26 and the center of gravity Tc of the opening T.

If the distance in a planar view between the center Lc1 of the microlens ML1 and the center of gravity Tc in the design of the opening T is large, there is a large risk that the light L5 refracted by the microlens ML1 is blocked by the light blocking layer 26 when reaching a surface in which the light blocking layer 26 is formed. In a planar view, the distance between the center Lc1 of the microlens ML1 and the center of gravity Tc of the opening T is set so as to be smaller than the distance between the center Lc2 of the microlens ML2 and the center of gravity Tc of the opening T, and thus it is possible to decrease a risk that the light L5 refracted by the microlens ML1 is blocked by the light blocking layer 26.

A position at which the microlens ML2 is provided in the element substrate 20A according to the second embodiment is not limited to the form described above. For example, the microlens ML2 may be configured so as to be provided between the pixel electrode 28 and the light blocking layer 26.

Third Embodiment

Electronic Apparatus

Figure 14:
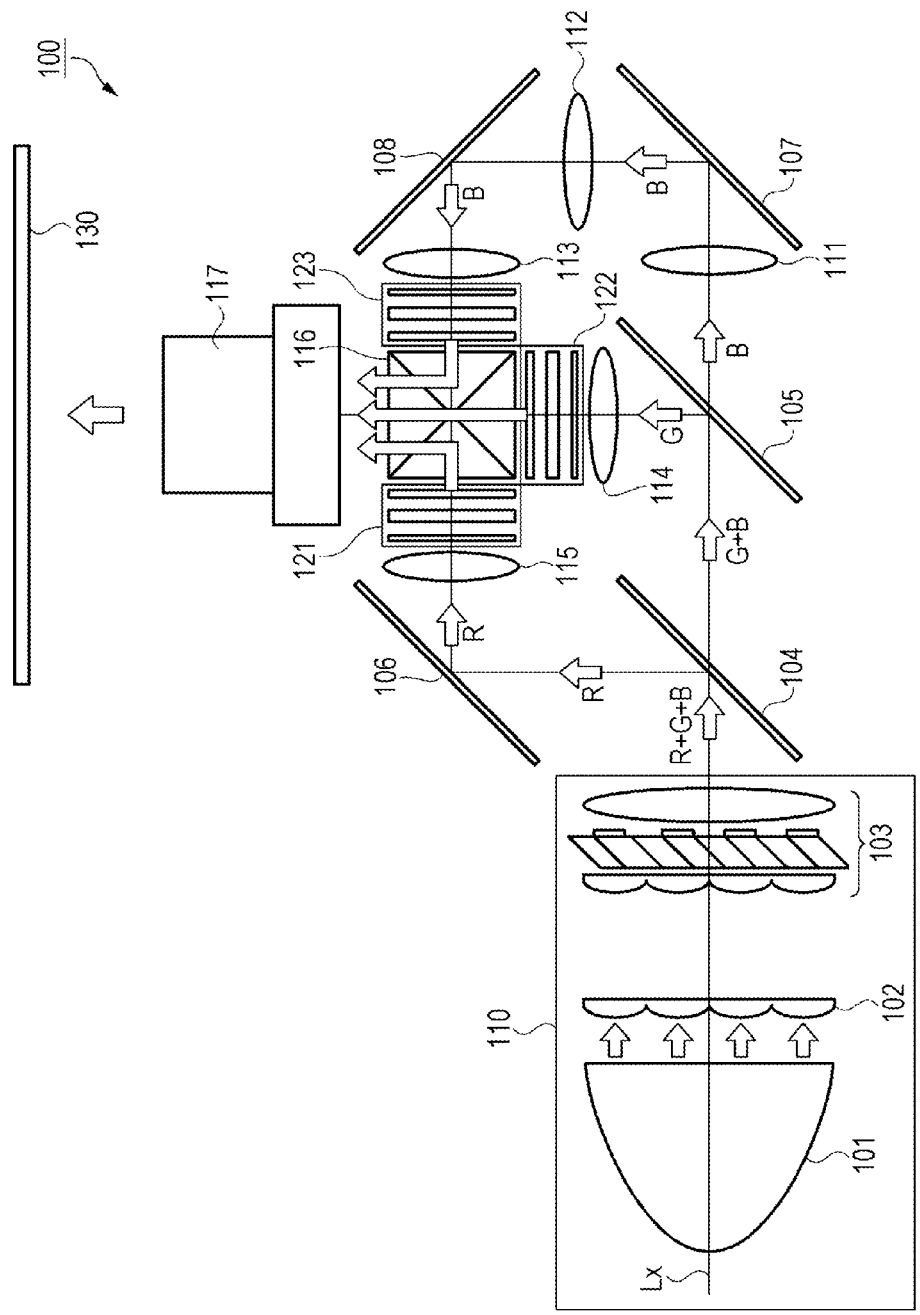
FIG. 14 is a schematic diagram illustrating a configuration of a projector which functions as an electronic apparatus according to a third embodiment.

Next, an electronic apparatus according to a third embodiment will be described with reference to FIG. 14. FIG. 14 is a schematic diagram illustrating a configuration of a projector which functions as an electronic apparatus according to the third embodiment.

As illustrated in FIG. 14, a projector (projection type display device) 100 as the electronic apparatus according to the third embodiment includes a polarization illumination device 110, two dichroic mirrors 104 and 105, three reflection mirrors 106, 107, and 108, five relay lenses 111, 112, 113, 114, and 115, three liquid crystal light valves 121, 122, and 123, a cross dichroic prism 116, and a projection lens 117.

The polarization illumination device 110 includes a lamp unit 101 as a light source configured by a white light source such as an ultra-high pressure mercury lamp or a halogen lamp, an integrator lens 102, and a polarization conversion element 103. The lamp unit 101, the integrator lamp 102, and the polarization conversion element 103 are disposed along a system optical axis Lx.

The dichroic mirror 104 reflects a red light (R), and makes a green light (G) and a blue light (B) pass through, among the polarized light beam emitted from the polarization illumination device 110. Another dichroic mirror 105 reflects the green light (G) that passes through the dichroic mirror 104, and makes the blue light (B) pass through.

The red light (R) reflected by the dichroic mirror 104 is reflected by the reflection mirror 106, and thereafter is incident on the liquid crystal light valve 121 via the relay lens 115. The green light (G) reflected by the dichroic mirror 105 is incident on the liquid crystal light valve 122 via the relay lens 114. The blue light (B) passing through the dichroic mirror 105 is incident on the liquid crystal light valve 123 via a light guide system that is configured by three relay lenses 111, 112, and 113, and two reflection mirrors 107 and 108.

The liquid crystal light valves 121, 122, and 123 of transmission type as an optical modulation element are respectively disposed so as to face incident surfaces of a cross dichroic prism 116 for each color light. Color light that is incident on the liquid crystal light valves 121, 122, and 123 is modulated based on video information (video signal), and is emitted toward the cross dichroic prism 116.

The cross dichroic prism 116 is configured by four rectangular prisms bonded to each other, and a dielectric multilayer film for reflecting red light and a dielectric multilayer film for reflecting blue light are formed in a cross shape in an internal surface thereof. Three color light are synthesized by the dielectric multilayer films, and light indicating a color image are synthesized. The synthesized light is projected on a screen 130 by a projection lens 117 that is a projection optical system, and an image is enlarged to be displayed.

The liquid crystal light valve 121 includes one of the liquid crystal device 1 or the liquid crystal device 1A in which the microlenses ML1 and ML2 of two stages according to the above-described embodiments are included. The liquid crystal light valve 121 is disposed so as to have gaps between a pair of polarization elements that is disposed in a cross nicol in an incident side and an emission side for color light. The other light valves 122 and 123 are configured in the same manner.

According to a configuration of the projector 100 of the third embodiment, since either the liquid crystal device 1 or the liquid crystal device 1A that can obtain a bright display and an excellent display quality is included, even though a plurality of pixels P is disposed with high definition, it is possible to provide the projector 100 with a bright display and an excellent display quality.

The above-described embodiment is merely intended to describe an embodiment of the invention, and can be arbitrarily modified and applied within the scope of the invention. As modification examples, for example, the following examples are considered.

First Modification Example

The liquid crystal devices 1 and 1A according to the above-described embodiments are configured to include the microlenses ML1 and ML2 of two stages, but the invention is not limited to these. For example, the invention may be configured to include microlenses of three stages. FIG. 15 is a schematic cross-sectional view illustrating a configuration of the liquid crystal device according to the first modification example. The same symbols or reference numerals will be attached to the same configuration elements as the above-described embodiments, and description thereof will be omitted.

As illustrated in FIG. 15, a liquid crystal device 1B according to a first modification example includes the counter substrate 30, an element substrate 20B, and a liquid crystal layer 40 which are the same as in the liquid crystal device 1 according to the first embodiment. The element substrate 20B according to the first modification example includes a microlens array substrate 60A, the light blocking layer 22, the insulating layer 23, the TFT 24, the insulating layer 25, the light blocking layer 26, the insulating layer 27, the pixel electrode 28, and the orientation film 29.

The microlens array substrate 60A includes the substrate 61 and a lens layer 64. By filling the concave portion 62 of the substrate 61 with a material that forms the lens layer 64, a microlens ML3 with a convex shape is configured as a third microlens. For example, since a material of the lens layer 64 is an inorganic material with a lower optical refractive index than that of the substrate 61, the microlens ML3 has a negative refractive power.

In the liquid crystal device 1B according to the first modification example, angles of the lights L1, L2, and L3 that are refracted toward the centers Lc1 and Lc2 sides, that is, the center of gravity Tc of the opening T of the pixel P by actions of the microlenses ML1 and ML2 of two stages, are returned toward the normal direction by the microlens ML3 of a third stage, and angles with respect to the normal direction can be aligned well and thus the light can be emitted. Accordingly, it is possible to more increase utilization efficiency of light in the electronic apparatus including the liquid crystal device 1B.

Also in the liquid crystal device 1B according to the first modification example, when a relative position shift of the microlens ML1, the microlens ML2, and the microlens ML3 with respect to the opening T occurs, it is possible to perform correction of the position shift in the same manner as in the embodiments described above. More specifically, while not illustrated, the element substrate 20B and the counter substrate 30 may be disposed such that each center of the microlens ML1, the microlens ML2, and the microlens ML3 is in the same side in at least one direction of the X direction and the Y direction with respect to the center of gravity in the design of the opening T. Accordingly, the same effects as in the above-described embodiments are obtained.

Second Modification Example

Figure 16A:
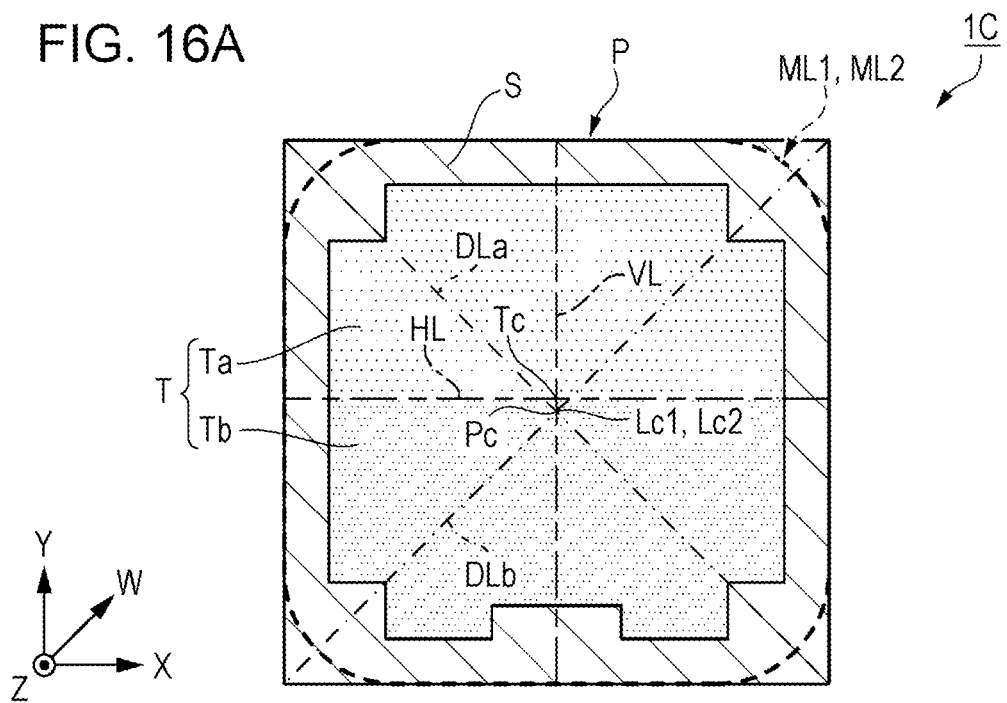
FIGS. 16A and 16B are schematic plan views illustrating a light blocking portion and an opening of a pixel of a liquid crystal device according to a second modification example.
Figure 16B:
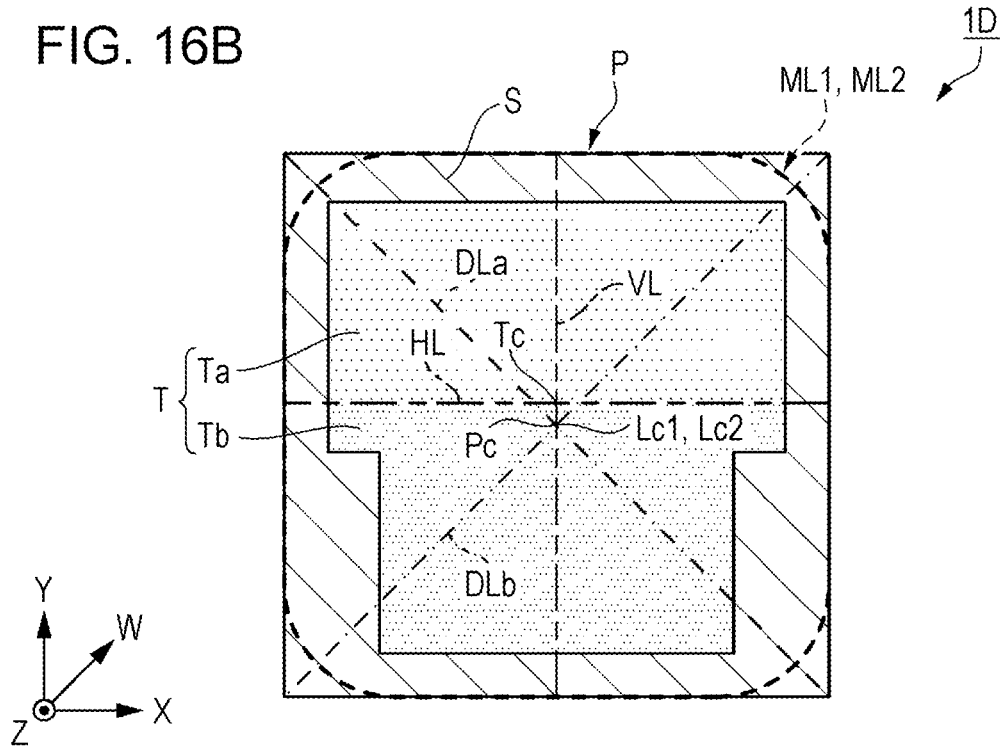

In the liquid crystal devices 1 and 1A according to the above-described embodiments, the opening T of the pixel P is configured to have an outline shape that is line-symmetric with respect to a straight line in the X direction and a straight line in the Y direction, but the invention is not limited to the shape. The opening T of the pixel P may be configured to have an outline shape that is line-symmetric with respect to a straight line in any one of the X direction and the Y direction. FIGS. 16A and 16B are schematic plan views illustrating a light blocking portion and an opening of a pixel of a liquid crystal device according to the second modification example. The same symbols or reference numerals will be attached to the same configuration elements as the above-described embodiments, and description thereof will be omitted.

In a liquid crystal device 1C illustrated in FIG. 16A, the light blocking portion S has a portion protruding toward the opening T at a central portion of a portion extending in the X direction. In addition, in a liquid crystal device 1D illustrated in FIG. 16B, the light blocking portion S has portions protruding toward the opening T at two corners of four corners. Such a shape of the light blocking portion S is due to the fact that a planar shape and disposition of the TFT 24 are different from those of the above-described embodiments. For this reason, the openings T of the pixels P in the liquid crystal devices 1C and 1D illustrated in FIG. 16A and FIG. 16B have outline shapes that are line-symmetric with respect to the straight line in the Y direction, but have outline shapes that are non-line-symmetric with respect to the straight line in the X direction.

The center of gravity Tc in the design of the openings T in the liquid crystal devices 1C and 1D illustrated in FIG. 16A and FIG. 16B is an intersecting point of a straight line HL in the X direction that divides the opening T into two portions Ta and Tb which are equal to each other in area, and a straight line VL in the Y direction passing through the center Pc of the pixel P. Since the opening T has an outline shape that is non-line-symmetric with respect to the straight line in the X direction, the center of gravity Tc in the design of the opening T is disposed at a position that is shifted toward the +Y direction from the center Pc of the pixel P.

Also in the configuration of the second modification example, when a relative position shift of the microlens ML1 and the microlens ML2 with respect to the opening T occurs, the correction of the position shift is performed in the same manner as in the above-described embodiments, and thus the same effects as those of the above-described embodiments are obtained. In addition, even when the relative position shift of the first microlens ML1 and the microlens ML2 with respect to the opening T occurs, it is possible to prevent an amount of light passing through the opening T from decreasing, compared to the liquid crystal device of the related art illustrated in FIG. 17, and to prevent a distribution of brightness in the inside of the opening T from being deviated. The opening T of the pixel P may have an outline shape other than the outline shapes illustrated in FIGS. 16A and 16B, and may have an outline shape that is line-symmetric with respect to a straight line in the X direction and that is non-line-symmetric with respect to a straight line in the Y direction.

Third Modification Example

The microlens ML1 according to the above-described embodiments is configured to have an inclined surface in the periphery of the concave portion 12, but the invention is not limited to the shape. For example, the microlens ML1 may not have an inclined surface in the periphery of the concave portion 12, and the entire concave portion 12 may be configured by a curved surface portion. Also in such a configuration, when a relative position shift of the microlens ML1 and the microlens ML2 with respect to the opening T occurs, the correction of the position shift is performed in the same manner as in the above-described embodiments, and thus the same effects as those of the above-described embodiments are obtained.

Fourth Modification Example

In a fabricating method of the liquid crystal device according to the above-described embodiment, by providing the control film 70, a difference of etching rate between a width direction and a depth direction is controlled in a step of performing isotropic etching, and thereby the concave portion 12 having an inclined surface is formed, but the invention is not limited to this form. For example, a resist layer is formed on the substrate 11, a shape that is a base of the concave portion 12 is formed in the resist layer by exposure that uses a gray scale mask, multi-stage exposure, or the like, anisotropic etching is performed on the resist layer and the substrate 11, using an approximately the same etching selection ratio, and thereby the shape of the concave portion 12 may be transferred to the substrate 11 so as to be formed. In this case, the control film 70 is not required.

Fifth Modification Example

An electronic apparatus to which the liquid crystal device 1 according to the above-described embodiment can be applied is not limited to the projector 100. The liquid crystal device 1 can be appropriately used as, for example, a projection type head-up display (HUD), a direct-view type head mounted display (HMD), an electronic book, a personal computer, a digital still camera, a liquid crystal television, a view finder type or monitor direct view type video recorder, a car navigation system, an electronic notebook, or a display unit of an information terminal apparatus such as a POS.

The entire disclosure of Japanese Patent Application No. 2014-100228, filed May 14, 2014 is expressly incorporated by reference herein.

What is claimed is:

1. An electro-optical device comprising:
   a first substrate that has a pixel and a light blocking portion which partitions an opening corresponding to a position of the pixel;
   a second substrate that opposes the first substrate and has a first microlens and a second microlens overlapping the first microlens; and
   an electro-optical layer that is disposed between the first substrate and the second substrate,
   wherein the light blocking portion includes a first portion extending in a first direction, and a second portion extending in a second direction that intersects the first direction, and
   wherein a center of the first microlens and a center of the second microlens are disposed on the same side in at least one direction of the first direction and the second direction with respect to a center of gravity of the opening, in a planar view.

2. The electro-optical device according to claim 1, wherein the center of the first microlens and the center of the second microlens are positioned on the same side in the first direction and the second direction with respect to the center of gravity of the opening.

3. The electro-optical device according to claim 1, wherein the first microlens is farther from the light blocking portion in a thickness direction of the first substrate and the second substrate than the second microlens, and
   wherein a distance between the center of the first microlens and the center of gravity of the opening, in a planar view, is smaller than a distance between the center of the second microlens and the center of gravity of the opening, in a planar view.

4. The electro-optical device according to claim 1, wherein the first microlens is included in a plurality of first microlenses and the second microlens is included in a plurality of second microlenses, and
   wherein the plurality of first microlenses and the plurality of second microlenses are formed so as to be continuously connected in the first direction and the second direction, respectively.

5. The electro-optical device according to claim 1, wherein an outline shape of the opening is a shape that is line-symmetric in at least one direction of the first direction and the second direction.

6. An electro-optical device comprising:
   a first substrate that has a pixel, a light blocking portion which partitions an opening corresponding to a position of the pixel, and a first microlens overlapping the pixel;
   a second substrate that opposes the first substrate and has a second microlens overlapping the first microlens; and
   an electro-optical layer that is disposed between the first substrate and the second substrate,
   wherein the light blocking portion includes a first portion extending in a first direction, and a second portion extending in a second direction that intersects the first direction, and
   wherein a center of the first microlens and a center of the second microlens are disposed on the same side in at least one direction of the first direction and the second direction with respect to a center of gravity of the opening, in a planar view.

7. The electro-optical device according to claim 6, wherein the center of the first microlens and the center of the second microlens are positioned on the same side in the first direction and the second direction with respect to the center of gravity of the opening.

8. The electro-optical device according to claim 6, wherein the second microlens is farther from the light blocking portion in a thickness direction of the first substrate and the second substrate than the first microlens, and
   wherein a distance between the center of the second microlens and the center of gravity of the opening, in a planar view, is smaller than a distance between the center of the first microlens and the center of gravity of the opening, in a lithe planar view.

9. The electro-optical device according to claim 6, wherein the first microlens is included in a plurality of first microlenses and the second microlens is included in a plurality of second microlenses, and
   wherein the plurality of first microlenses and the plurality of second microlenses are formed so as to be continuously connected in the first direction and the second direction, respectively.

10. The electro-optical device according to claim 6, wherein an outline shape of the opening is a shape that is line-symmetric in at least one direction of the first direction and the second direction.

11. An electronic apparatus comprising the electro-optical device according to claim 1.

12. An electronic apparatus comprising the electro-optical device according to claim 6.

13. An electro-optical device comprising:
   a first substrate that has a pixel and a light blocking portion which partitions an opening corresponding to a position of the pixel;
   a second substrate that opposes the first substrate and has a first microlens and a second microlens overlapping the first microlens; and
   an electro-optical layer that is disposed between the first substrate and the second substrate,
   wherein a center of the first microlens and a center of the second microlens are out of alignment with respect to a center of gravity of the opening.

14. An electronic apparatus comprising the electro-optical device according to claim 13.

15. An electro-optical device comprising:
- a first substrate that has a pixel, a light blocking portion which partitions an opening corresponding to a position of the pixel, and a first microlens;
- a second substrate that opposes the first substrate and has a second microlens overlapping the first microlens; and
- an electro-optical layer that is disposed between the first substrate and the second substrate,
- wherein a center of the first microlens and a center of the second microlens are out of alignment with respect to a center of gravity of the opening.

16. An electronic apparatus comprising the electro-optical device according to claim 15.

* * * * *